(12) United States Patent
Okada et al.

(10) Patent No.: US 7,391,010 B2
(45) Date of Patent: Jun. 24, 2008

(54) PHOTOELECTRIC ENCODER AND ELECTRONIC EQUIPMENT WITH INCREASED RESOLUTION

(75) Inventors: Norikazu Okada, Kashihara (JP); Noritaka Kishi, Tenri (JP); Keiko Higashi, Gose (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/397,805

(22) Filed: Apr. 5, 2006

(65) Prior Publication Data
US 2006/0226349 A1    Oct. 12, 2006

(30) Foreign Application Priority Data
Apr. 6, 2005 (JP) ............................. P2005-109732
Jun. 28, 2005 (JP) ............................. P2005-188541
Dec. 20, 2005 (JP) ............................. P2005-366734

(51) Int. Cl.
*G01D 5/34*    (2006.01)

(52) U.S. Cl. ............................... 250/231.16; 250/231.18

(58) Field of Classification Search ...............................
250/231.13–231.18, 237 R, 237 G; 356/616–619; 341/11, 13, 31; 359/436–442, 566; 33/1 PT, 33/1 N
See application file for complete search history.

(56) References Cited

U.S. PATENT DOCUMENTS

| | | | | |
|---|---|---|---|---|
| 4,079,251 A | * | 3/1978 | Osann, Jr. ............... | 250/231.16 |
| 4,360,730 A | * | 11/1982 | Breslow ................. | 250/231.13 |
| 4,529,964 A | * | 7/1985 | Minami et al. ................ | 341/13 |
| 4,575,684 A | * | 3/1986 | Stamm ....................... | 329/307 |
| 4,769,630 A | * | 9/1988 | Taillebois et al. .............. | 341/8 |
| 5,438,193 A | * | 8/1995 | Takagi et al. ........... | 250/231.18 |
| 6,002,249 A | * | 12/1999 | Futsuhara ................... | 324/160 |
| 7,227,125 B2 | * | 6/2007 | Sannomiya et al. .... | 250/231.13 |

FOREIGN PATENT DOCUMENTS

| | | |
|---|---|---|
| JP | 56-153816 U | 11/1981 |
| JP | 62-108114 A | 5/1987 |
| JP | 4-110614 A | 4/1992 |
| JP | 7-12924 | 3/1995 |
| JP | 7-26719 U | 5/1995 |
| JP | 11-122195 A | 4/1999 |
| JP | 2001-74504 A | 3/2001 |
| JP | 2001-99684 A | 4/2001 |
| JP | 3256109 B2 | 11/2001 |
| JP | 2002-22497 A | 1/2002 |

* cited by examiner

*Primary Examiner*—Georgia Epps
*Assistant Examiner*—Francis M LeGasse, Jr.
(74) *Attorney, Agent, or Firm*—Birch, Stewart, Kolasch & Birch, LLP

(57) ABSTRACT

The photoelectric encoder of the present invention has a light-emitting device and light-receiving devices arranged in one direction in a region that light from the light-emitting device can reach. When a moving object that alternately has a light-on portion that produces a state in which light is incident on the light-receiving device and a light-off portion that produces a state in which light is not incident on the light-receiving device passes at a prescribed movement frequency in the one direction, an output of each of the light-receiving devices takes a value corresponding to the incidence or non-incidence of light on the light-receiving device. A logical operating section carries out operation of the logical values expressed by the outputs of the light-receiving devices to form an output signal that has a frequency different from the movement frequency.

5 Claims, 33 Drawing Sheets

PHOTOELECTRIC ENCODER AND ELECTRONIC EQUIPMENT WITH INCREASED RESOLUTION

CROSS-REFERENCE TO RELATED APPLICATIONS

This Nonprovisional application claims priority under 35 U.S.C. §119(a) on Patent Applications No. 2005-109732 filed in Japan on Apr. 6, 2005, No. 2005-188541 filed in Japan on Jun. 28, 2005 and No. 2005-366734 filed in Japan on Dec. 20, 2005, the entire contents of which are hereby incorporated by reference.

BACKGROUND OF THE INVENTION

The present invention relates to photoelectric encoders. The present invention relates, in particular, to, for example, photoelectric encoders of a light transmission type and a light reflection type employing a moving object with a plurality of slits formed.

The present invention also relates to electronic equipment provided with such a photoelectric encoder. The electronic equipment widely includes printing machines such as copying machines and printers and FA (Factory Automation) equipment such as robots.

As this kind of photoelectric encoder, a light transmission type as shown in FIG. 12A in which a light-emitting section 101 and a light-receiving section 102 are arranged facing each other, and an output is obtained by making a moving object 103 that has a plurality of slits formed pass between the light-emitting section 101 and the light-receiving section 102, and a light reflection type as shown in FIG. 12B in which a light-emitting section 201 and a light-receiving section 202 are arranged side by side, and an output is obtained by making a moving object 203 that has a plurality of slits formed pass through positions opposite to the light-emitting section 201 and the light-receiving section 202 are known.

The photoelectric encoder of the light transmission type often has a moving object 40, which has a plurality of slits X1, X2, . . . at a constant pitch P in the movement direction and whose slit width is 1/2 pitch (i.e., P/2) as schematically shown at the top of FIG. 11 between the light-emitting device and the light-receiving device arranged facing each other. In the light transmission type, the slits X1, X2, . . . correspond to portions (referred to as a "light-on portion") that make light incident on the light-receiving device, and portions Y1, Y2, . . . constructed of a plate material (material of moving object) located between the slits X1, X2, . . . correspond to portions (referred to as a "light-off portion") that does not make light incident on the light-receiving device.

For example, in the device described in JP 3256109, as shown in the middle of FIG. 11, four photodiodes PD1, PD2, PD3 and PD4 whose width is a half (i.e., P/4) of each slit width are arranged without spacing along the direction in which the slits X1, X2, . . . of the moving object 40 are arranged, and four signals (assumed to be A+, B−, A− and B+ in a sequence) outputted from the photodiodes PD1, PD2, PD3 and PD4 are read. By comparison between A+ and A− and between B+ and B− of these four signals by respective comparators, two output signals whose phases are mutually different by 90° are obtained.

Moreover, in the device of JP 2001-99684 A, as shown at the bottom of FIG. 11, four photodiodes 13a, 13b, 13c and 13d whose width is equal (i.e., P/2) to the slit width are arranged at 3/4 pitch (i.e., 3P/4) along the direction in which the slits X1, X2, . . . of the moving object 40 are arranged, and four signals (assumed to be A+, B+, A− and B− in a sequence) outputted from the photodiodes 13a, 13b, 13c and 13d are read. By comparison between A+ and A− and between B+ and B− of these four signals by respective comparators, two output signals whose phases are mutually different by 90° are obtained.

SUMMARY OF THE INVENTION

In both the prior art examples, the frequency of the output signal is equal to the frequency of the passing of the slits X1, X2, . . . of the moving object 40 through a portion corresponding to a certain photodiode (the frequency referred to as a "movement frequency"). Therefore, minute frequency changes have conventionally been not able to be read, and there has been a limitation in improving the resolution during use.

In this case, it can be considered that the frequency of the output of the light-receiving device is increased by reducing the slit pitch of the moving object in order to improve the resolution. However, if the slit width is narrowed as the slit pitch is reduced, the quantity of input light cannot be secured, and this leads to a reduction in the SN ratio (signal-to-noise ratio) Moreover, a trouble (crosstalk) that a light-receiving device on which the light that has passed through a certain slit is incident receives diffracted light that has passed through the neighbor slit is also considered. An offset between signals becomes large, and the characteristics deteriorate.

The same thing can be said for the photoelectric encoder of the light reflection type, not being limited to the photoelectric encoder of the light transmission type. However, conversely to the light transmission type, the slit corresponds to the light-off portion that makes no light be incident on the light-receiving device, and the portion constructed of the plate material between slits (portion that reflects light) corresponds to the light-on portion that makes light incident on the light-receiving device in the light reflection type.

It is an object of the present invention to provide a photoelectric encoder capable of obtaining an output signal of a frequency higher than the movement frequency of the light-on portion regardless of the pitch of the light-on portion (e.g., slit in the light transmission type) provided at the moving object.

Another object is to provide electronic equipment provided with such a photoelectric encoder.

In order to solve the problem, the photoelectric encoder of the present invention comprises:
a light-emitting device; and
a plurality of light-receiving devices which are arranged in one direction in a region that light from the light-emitting device can reach, wherein,
when a moving object alternately having a light-on portion that produces a state in which the light is incident on the light-receiving device and a light-off portion that produces a state in which the light is not incident on the light-receiving device passes along the one direction at a prescribed movement frequency through a prescribed position corresponding to each of the light-receiving devices, an output of each of the light-receiving devices takes a value corresponding to incidence or nonincidence of light from the light-emitting device on the light-receiving device, and further comprises:
a logical operating section for forming an output signal that has a frequency different from the movement frequency through operation of logical values obtained from the outputs of the light-receiving devices.

In this case, the "movement frequency" means the frequency of the passing of the light-on portion of the moving object through a position corresponding to a certain light-receiving device in a unit time. It is noted that, when a plurality of light-on portions are provided at the moving object, the individual light-on portions are not distinguished in counting the movement frequency, and the passing of any light-on portion is counted one time.

In the photoelectric encoder of the present invention, the light-on portion and the light-off portion of the moving object alternately pass through the prescribed position corresponding to each of the light-receiving devices at a prescribed movement frequency along the direction in which the light-receiving devices are arranged. The light-on portion and the light-off portion produce a state in which light from each of the light-emitting device is incident or not incident on the light-receiving device when passing through the position. In accordance with the passing of the light-on portion and the light-off portion of the moving object sequentially through the positions corresponding to the plurality of light-receiving devices, the output values of the plurality of light-receiving devices sequentially change. Then, the logical operating section carries out operation of the logical values expressed by the outputs of the light-receiving devices to form an output signal that has a frequency different from the movement frequency. In particular, if the logical operating section forms an output signal that has a frequency higher than the movement frequency, the resolution can be improved, and movement information of the moving speed, the moving direction and so on of the moving object can be obtained more accurately. Moreover, since this is possible even with the pitch of the light-on portions maintained regardless of the pitch of the light-on portions provided at the moving object, the problems of the reduction in the SN ratio and the crosstalk do not occur. Moreover, if the logical operating section forms an output signal that has a frequency lower than the movement frequency when the movement frequency is comparatively high, it is also possible to prevent waveform collapse.

The actual waveform of the output of each of the light-receiving devices sometimes becomes close to the sine wave rather than a rectangular wave due to the influence of the diffraction of light. Accordingly, it is desirable to provide an AD conversion section that forms a digital logic value by carrying out AD (analog-to-digital) conversion of the output of each of the light-receiving devices. With the arrangement, the output of each of the light-receiving devices comes to have a rectangular waveform that more reliably represents the digital logic value. Furthermore, it is desirable to amplify the output of each of the light-receiving devices before the AD conversion is carried out.

In the photoelectric encoder of one embodiment, the output signal formed by the logical operating section has a frequency that is an integral multiple of the movement frequency.

In a stage subsequent to the reception of the photoelectric encoder output, it is presumed that an ASIC (Application Specific Integrated Circuit: Integrated circuit for a specific application) is provided. In the photoelectric encoder of the present one embodiment, the frequency of the output signal formed by the logical operating section is an integral multiple of the movement frequency. Therefore, taking the operation of the ASIC into consideration, control can be made smooth, and this is useful.

In the photoelectric encoder of one embodiment, the output signal formed by the logical operating section has a duty ratio different from a duty ratio of the output of each of the light-receiving devices.

In this case, the "duty ratio" means the ratio of a high-level period and a cycle (=high-level period/cycle) in a cyclic signal that repeats a high-level period and a low-level period.

In the photoelectric encoder of the present one embodiment, it is possible to reduce the consumption current by shortening the ON-state time of the IC (Integrated Circuit) provided in the stage subsequent to the photoelectric encoder and prevent waveform collapse when the movement frequency is comparatively high, and this is useful.

In the photoelectric encoder of one embodiment, the light-on portion and the light-off portion of the moving object have same dimension in the one direction.

In the photoelectric encoder of the present one embodiment, the light-on portion and the light-off portion of the moving object have same dimension in the one direction. Therefore, the same number of light-receiving devices are easily arranged in the region corresponding to the light-on portion (referred to as a "light-on portion corresponding region") and the region corresponding to the light-off portion (referred to as a "light-off portion corresponding region") in the one direction. With the arrangement, the background noise can be removed by taking a difference between the output of the light-receiving device placed in the light-on portion corresponding region and the output of the light-receiving device placed in the light-off portion corresponding region. Therefore, the passing of the light-on portion and the light-off portion of the moving object can be detected with high accuracy.

In the photoelectric encoder of one embodiment, the logical operating section takes an exclusive-OR of logical values expressed by the outputs of the light-receiving devices.

In the photoelectric encoder of the present one embodiment, the logical operating section takes an exclusive-OR of the logical values expressed by the outputs of the light-receiving devices. The exclusive-OR has its output changed from logic 1, logic 0, logic 1, . . . as the number of inputs of logic 1 changes from an odd number, an even number, an odd number, . . . Therefore, an output signal of a frequency higher than the movement frequency can easily be formed.

In the photoelectric encoder of one embodiment, the logical operating section takes an exclusive-OR (EXOR) of logical values expressed by the outputs of the light-receiving devices a plurality of times.

In the photoelectric encoder of the present one embodiment, the logical operating section takes an exclusive-OR of the logical values expressed by the outputs of the light-receiving devices a plurality of times, and therefore, an output signal of a frequency higher than the movement frequency can easily be formed. Moreover, it is possible to increase the frequency of the output signal and reduce the number of signals in comparison with the case where an exclusive-OR is taken only once, and this is useful.

In the photoelectric encoder of one embodiment, the logical operating section takes an exclusive-OR (EXOR) of logical values expressed by the outputs of the light-receiving devices and further takes a logical product (AND) or nonconjunction (NAND).

In the photoelectric encoder of the present one embodiment, the logical operating section takes an exclusive-OR of the logical values expressed by the outputs of the light-receiving devices to take a logical product or nonconjunction, and therefore, an output signal of a frequency higher than the movement frequency can easily be formed. Moreover, the logical operation becomes simpler than when the exclusive-OR operation is repeated a plurality of times. Therefore, the number of elements that constitute the logical operating section can be reduced.

It is noted that the logical product or nonconjunction may be taken a plurality of times.

In the photoelectric encoder of one embodiment, the logical operating section generates a plurality of signals that have a duty ratio of 3/4 by taking an exclusive-OR of the logical values expressed by the outputs of the light-receiving devices and, by taking a logical product or nonconjunction of the signals, obtains a signal that has a duty ratio of 1/2.

In the photoelectric encoder of the present one embodiment, the logical product or nonconjunction is used in a certain stage of the logical operation. Therefore, the logical operation becomes simpler than when the exclusive-OR is repeatedly taken a plurality of times. Therefore, the number of elements that constitute the logical operating section can be reduced.

In the photoelectric encoder of one embodiment, the logical operating section comprises an integrated injection logic device and carries out the operation by using the integrated injection logic device.

In the photoelectric encoder of one embodiment, the integrated injection logic (IIL) device is included as a constituent element of the logical operating section, and therefore, the logical operating section can easily be constituted of a bipolar IC. Therefore, it becomes easy to integrally form the light-receiving device with the logical operating section.

In the photoelectric encoder of one embodiment, a plurality of the light-receiving devices are arranged in the one direction in a light-on portion corresponding region that corresponds to the light-on portion of the moving object.

In the photoelectric encoder of the present one embodiment, the plurality of light-receiving devices arranged in the light-on portion corresponding region output the signals that have mutually different phases. Therefore, by the logical operating section carrying out the operation of the logical values expressed by the outputs of the light-receiving devices, for example, by taking an exclusive-OR (EXOR), an output signal of a frequency higher than the movement frequency can easily be formed.

In the photoelectric encoder of one embodiment, the plurality of light-receiving devices arranged in the light-on portion corresponding region have same dimension and are arranged at a constant pitch in the one direction.

In the photoelectric encoder of the present one embodiment, the plurality of light-receiving devices arranged in the light-on portion corresponding region output the signals of mutually different phases and same pulsewidth. With the arrangement, the logical operating section is able to form an output signal that has a frequency higher than the movement frequency and a constant duty ratio.

It is desirable to provide an AD conversion section that forms a digital logic value by AD (analog-to-digital) conversion of the output of each of the light-receiving devices as already described. With the arrangement, the output of each of the light-receiving devices comes to have a rectangular waveform that more securely expresses the digital logic value. Furthermore, it is desirable to amplify the output of each of the light-receiving devices before the AD conversion is carried out.

In the photoelectric encoder of one embodiment, the light-receiving devices located mutually adjacently in the one direction have photoelectric current output ports that are arranged mutually oppositely in a direction substantially perpendicular to the one direction.

In order to obtain a frequency higher than the movement frequency, it is desirable to increase the resolution by reducing the device dimension in the one direction of each of the light-receiving devices. However, if the dimension of each of the light-receiving devices is merely reduced, an area necessary for the output port of the photoelectric current (photoelectric current output port) outputted from each of the light-receiving devices cannot be secured, and the arrangement becomes difficult. Accordingly, in the photoelectric encoder of the present one embodiment, the photoelectric current output ports of the mutually adjacent light-receiving devices in the one direction are arranged on the mutually opposite sides of the array constructed of the plurality of light-receiving devices in the direction substantially perpendicular to the one direction. With this arrangement, even when the dimension of each of the light-receiving devices is reduced, the area necessary for the photoelectric current output port of each of the light-receiving devices can be secured, and the arrangement becomes possible.

In the photoelectric encoder of one embodiment, a plurality of the light-receiving devices have same dimension and are arranged at common constant pitches in the one direction in a light-on portion corresponding region that corresponds to the light-on portion and a light-off portion corresponding region that corresponds to the light-off portion, respectively, and the photoelectric encoder comprises a comparing section that makes the light-receiving devices arranged in the light-on portion corresponding region and the light-receiving devices arranged in the light-off portion corresponding region correspond to each other one to one in order of arrangement in the one direction and takes a difference between outputs of the light-receiving device pair that are made to correspond to each other one to one, wherein the logical operating section carries out operation of logical values expressed by differential signals obtained by taking the difference by the comparing section.

In the photoelectric encoder of the present one embodiment, the comparing section makes the light-receiving devices arranged in the light-on portion corresponding region and the light-receiving devices arranged in the light-off portion corresponding region correspond to each other one to one in order of arrangement in the one direction and takes a difference between the outputs of the light-receiving device pair that correspond to each other one to one. That is, the difference between the outputs of which the phases are shifted by 180° with respect to the movement frequency is taken. As a result, the background noise can be removed with high accuracy. Therefore, the passing of the light-on portion and the light-off portion of the moving object can be detected with high accuracy. Moreover, the light-receiving devices have the same dimensions in the one direction and are arranged at common constant pitches in the light-on portion corresponding region and the light-off portion corresponding region. Therefore, the group of the differential signals obtained from the plurality of light-receiving device pairs come to have mutually different phases depending on the order of arrangement of the plurality of light-receiving device pairs (i.e., the order of arrangement of the light-receiving devices that constitute the pairs in the light-on portion corresponding region and the light-off portion corresponding region) and same pulsewidth. Therefore, by the logical operating section carrying out operation of logical values expressed by the differential signals, for example, by taking an exclusive-OR (EXOR), an output signal having a frequency higher than the movement frequency and a constant duty ratio can be formed.

In the photoelectric encoder of one embodiment, a waveform shaping section that shapes a waveform of an input to the logical operating section so that rise and fall of the waveform become steep.

When the movement frequency of the moving object is set low, the waveform changes in the outputs of the light-receiving devices become gentle, and the rise and fall of the waveforms of the inputs to the logical operating section also become gentle. Therefore, it is possible that a chattering phenomenon (phenomenon that high and low levels frequently change in a short time, causing instability) might occur in the output signal of the logical operating section as a consequence of changes in the inputs to the logical operating section across the threshold value for the logical operation under the influences of noise and the like during the rise or fall of the inputs to the logical operating section. Accordingly, in the photoelectric encoder of the present one embodiment, the waveform shaping section shapes the waveforms of the inputs to the logical operating section so that the rise and fall of the waveform become steep. As a result, the inputs to the logical operating section become hard to receive the influences of noise and the like, and the chattering phenomenon can be prevented from occurring.

The photoelectric encoder of one embodiment, comprises:

a waveform shaping section that shapes a waveform of the differential signal outputted from the comparing section so that rise and fall of the waveform become steep, wherein an output of the waveform shaping section is inputted to the logical operating section.

In the photoelectric encoder of the present one embodiment, the input to the logical operating section becomes hard to receive the influences of noise and the like, and the chattering phenomenon can be prevented from occurring.

In the photoelectric encoder of one embodiment, the comparing section comprises logarithmic amplifiers corresponding to the respective light-receiving device pairs, and each of the logarithmic amplifiers logarithmically amplifies a difference between the outputs of the corresponding light-receiving device pairs.

In the photoelectric encoder of the present one embodiment, each of the logarithmic amplifiers of the comparing section logarithmically amplifies the difference between the outputs of the corresponding light-receiving device pair. Therefore, the SN ratio (signal-to-noise ratio) can be secured even with faint light incident on each of the light-receiving devices, and this is useful.

In the photoelectric encoder of one embodiment, the comparing section comprises amplifiers corresponding to the light-receiving device pairs, and the photoelectric encoder comprises:

an identical supply current circuit for supplying a current to each of the amplifiers.

In the photoelectric encoder of the present one embodiment, an identical supply current circuit supplies a current to each of the amplifiers of the comparing section. Therefore, the amplification factor of each of the amplifiers can easily be uniformed identical. Therefore, the accuracy of the output signal is increased.

In the photoelectric encoder of one embodiment, the comparing section comprises amplifiers corresponding to the respective light-receiving device pairs, the plurality of amplifiers are arranged in the one direction along an array constructed of the plurality of light-receiving devices, and a center position of the array constructed of the plurality of light-receiving devices and a center position of an array constructed of the plurality of amplifiers coincide with each other in the one direction.

In the photoelectric encoder of the present one embodiment, the center position of the array constructed of the plurality of light-receiving devices and the center position of the array constructed of the plurality of amplifiers coincide with each other in the one direction. Therefore, the length of each of the wiring lines from the plurality of light-receiving devices to the plurality of amplifiers can be uniformed comparatively satisfactorily. Therefore, the variation in the signal delay and so on attributed to the differences in the length of the wiring lines can be suppressed. As a result, the accuracy of the output signal is increased.

In the photoelectric encoder of one embodiment, the comparing section comprises amplifiers corresponding to the respective light-receiving device pairs, and the plurality of amplifiers are arranged in a center portion of a semiconductor chip on which the plurality of light-receiving devices are arranged in common.

In the photoelectric encoder of the present one embodiment, the plurality of amplifiers are arranged in a center portion of a semiconductor chip on which the plurality of light-receiving devices are arranged in common. That is, the plurality of amplifiers are gathered in the center portion of the semiconductor chip. With the arrangement, variation in the manufacturing processes and variation ascribed to a stress and so on are suppressed between the amplifiers.

Moreover, when the plurality of amplifiers are arranged in the center portion of the semiconductor chip as described above, it is desirable to arrange the logical operating section, the output circuit section for amplifying the output of the logical operating section and the output terminal for taking out the output of the output circuit section to the outside of the semiconductor chip at the periphery of the semiconductor chip (i.e., periphery that surrounds the plurality of amplifiers). This arrangement results in the adjacent location of the logical operating section to the output terminal via the output circuit section, and therefore, a wiring resistance from the logical operating section to the output terminal can be reduced.

In the photoelectric encoder of one embodiment, the comparing section comprises amplifiers corresponding to the respective light-receiving device pairs, and amplifiers, whose logical values expressed by the outputted differential signals are subjected to operation by the logical operating section, among the plurality of amplifiers are arranged mutually adjacently.

In the photoelectric encoder of the present one embodiment, the amplifiers, whose logical values expressed by the outputted differential signals are subjected to operation by the logical operating section among the plurality of amplifiers, are arranged mutually adjacently. With the arrangement, the wiring lines that lead the outputs of the amplifiers to the logical operating section are simplified. Therefore, mutual influences between the differential signals outputted from the amplifiers and variation in the wiring resistance and so on are suppressed.

In the photoelectric encoder of one embodiment, the comparing section uses the outputs of the light-receiving devices, which are arranged in the light-off portion corresponding region, of the light-receiving device pairs as reference inputs.

In this case, the "reference input" means the input that becomes a negative input of two inputs. For example, assuming that a difference between two inputs A and A' is (A−A'), then the reference input is A'.

In the photoelectric encoder of the present one embodiment, the comparing section uses the output of the light-receiving device arranged in the light-off portion corresponding region of each of the light-receiving device pairs as the reference input (i.e., negative input) among the light-receiving device pairs. Therefore, the group of the differential signals obtained from the plurality of light-receiving device pairs comes to have same pulsewidth and phases different by certain angles in order of arrangement of the light-receiving device pairs within a phase shift of 180° with respect to the movement frequency. Therefore, by the logical operating section carrying out operation of the logical values expressed by the differential signals, for example, by taking an exclusive-OR (EXOR), an output signal that has a frequency higher than the movement frequency and a constant duty ratio (meaning a high-level period/cycle in a cyclic signal that repeats a high-level period and a low-level period) can be formed with high accuracy.

In the photoelectric encoder of one embodiment, the logical operating section carries out operation by distributing signals, which are obtained from the plurality of light-receiving devices arranged in a light-on portion corresponding region that corresponds to the light-on portion of the moving object, into a plurality of groups in order of arrangement of the plurality of light-receiving devices and obtains a plurality of output signals that have mutually different phases.

In the photoelectric encoder of the present one embodiment, the logical operating section obtains a plurality of output signals that have mutually different phases by carrying out operation with distributing the signals obtained from the plurality of light-receiving devices into a plurality of groups on the basis of the order of arrangement of the plurality of light-receiving devices. As a result, the plurality of output signals that have a frequency higher than the movement frequency and mutually different phases can be obtained.

It is noted that the logical operating section should desirably obtain a plurality of output signals with mutually different phases by carrying out operation with distributing the difference signals obtained from the plurality of light-receiving device pairs into a plurality of groups on the basis of the order of arrangement of the plurality of light-receiving device pairs.

In the photoelectric encoder of one embodiment, the logical operating section cyclically distributes the signals obtained from the plurality of light-receiving devices arranged in the light-on portion corresponding region into a plurality of groups in order of arrangement of the plurality of light-receiving devices in the one direction.

In the photoelectric encoder of the present one embodiment, a plurality of output signals that have a frequency higher than the movement frequency and phases mutually different by certain angles are obtained. The obtained plurality of output signals becomes hard to receive the influence of the variation in the quantity of light depending on the light-emitting devices.

In the photoelectric encoder of one embodiment, the logical operating section distributes the signals obtained from the plurality of light-receiving devices arranged in the light-on portion corresponding region into two groups.

In the photoelectric encoder of the present one embodiment, two output signals that have a frequency higher than the movement frequency and phases mutually different by 90° are obtained. The obtained two output signals become hard to receive the influences of variation in the quantity of light depending on the light-emitting devices.

The logical operating section should desirably distribute the differential signals obtained from the plurality of light-receiving device pairs alternately into two groups in order of arrangement in one direction of the plurality of light-receiving device pairs.

In the photoelectric encoder of one embodiment, the plurality of light-receiving devices arranged in the light-on portion corresponding region are arranged at a constant pitch in the one direction, and ends of the light-receiving devices are correspondingly arranged on lines obtained by dividing the light-on portion corresponding region at equal intervals at the pitch.

In the photoelectric encoder of the present one embodiment, the plurality of light-receiving devices arranged in the light-on portion corresponding region output the signals that have mutually different phases and same pulsewidth. As a result, the logical operating section is able to form output signals that have a frequency higher than the movement frequency and a constant duty ratio. Moreover, since the ends of the light-receiving devices are correspondingly arranged on the line obtained by dividing the light-on portion corresponding region at equal intervals by the pitch, the dimension of each of the light-receiving devices can be maximized in each of the regions divided in the one direction. Therefore, the light-receiving surface of each of the light-receiving devices can be widened to allow the sensitivity to be improved.

In the photoelectric encoder of one embodiment, k (k: natural number of not smaller than two) light-receiving devices are arranged in the light-on portion corresponding region that corresponds to the light-on portion of the moving object in the one direction.

In the photoelectric encoder of the present one embodiment, the k light-receiving devices arranged in the light-on portion corresponding region output k signals that have mutually different phases. Therefore, by the logical operating section carrying out operation of the logical values expressed by the outputs of the light-receiving devices, for example, by taking an exclusive-OR (EXOR), an output signal of a frequency k times as high as the movement frequency can be formed.

In the photoelectric encoder of one embodiment, k is not smaller than three, and the logical operating section takes an exclusive-OR by adding the logical values expressed by the outputs of the light-receiving devices in order in which the light-receiving devices adjoin in the one direction.

Generally, in the case where an exclusive-OR is taken when there are three or more logical values, operation is first carried out by selecting two logical values, and operation is carried out by adding another logical value to the operation result, the operations being repeated. Since the photoelectric encoder has various variation conditions such as variation in the quantity of light depending on the light-emitting devices and assembly variation, the accuracy is increased by regularly carrying out the operation sequence. In this case, the photoelectric encoder of the present one embodiment takes an exclusive-OR by sequentially adding the logical values expressed by the outputs of the light-receiving devices in the order in which the light-receiving devices adjoin in the one direction. Therefore, the obtained output signal becomes hard to receive the influence of the variation in the quantity of light depending on the light-emitting devices and so on.

In the photoelectric encoder of one embodiment, k is not smaller than three, and the logical operating section takes an exclusive-OR by adding the logical values expressed by the outputs of the light-receiving devices in order from the light-receiving devices arranged at opposite end portions in the one direction in the light-on portion corresponding region alternately toward the light-receiving devices arranged in a center portion.

Also, in the photoelectric encoder of the present one embodiment, the obtained output signal similarly becomes hard to receive the influence of the variation in the quantity of light depending on the light-emitting device and so on.

In the photoelectric encoder of one embodiment, the logical operating section distributes signals obtained from the plurality of light-receiving devices arranged in a light-on portion corresponding region that corresponds to the light-on portion of the moving object into two groups that have phases mutually different by 90° and takes an exclusive-OR of the signals that have phases mutually different by 90°.

In the photoelectric encoder of the present one embodiment, the logical operating section distributes the signals obtained from the plurality of light-receiving devices arranged in the light-on portion corresponding region that corresponds to the light-on portion of the moving object into two groups that have phases mutually different by 90° and takes an exclusive-OR of the signals that have phases mutually different by 90°. Therefore, if the exclusive-OR is taken only once, an output signal that has a frequency double the movement frequency is obtained, and this is useful.

In the photoelectric encoder of one embodiment, a delay section that delays an output signal formed by the logical operating section with respect to a signal inputted to the logical operating section.

When the output signal formed by the logical operating section is taken out of the semiconductor chip, the quantity of current is sometimes increased to make the output signal have low impedance. In such a case, the voltage change becomes large when the level of the output signal changes between high and low levels. Therefore, it is concerned that such a voltage change is fed back to the input of the logical operating section and causes malfunction. Accordingly, the photoelectric encoder of the present one embodiment has a delay section to delay the output signal formed by the logical operating section with respect to the signal inputted to the logical operating section. With this arrangement, such a malfunction is prevented.

The photoelectric encoder of one embodiment comprises:

an output section that includes a transistor for amplifying the output signal formed by the logical operating section, wherein the transistor has a base current that is a power voltage dependence current.

In the photoelectric encoder of the present one embodiment, the base current of the transistor of the output circuit section is the power voltage dependence current. For example, if the transistor is an npn transistor, the capability of extracting the current is improved when the base current is served as a power voltage dependence type. Therefore, even when electric charge is accumulated by the turbulence of static electricity or the like, the output circuit section and, consequently, the photoelectric encoder are suppressed from malfunction.

The electronic equipment of the present invention is provided with the photoelectric encoder of the present invention.

In the electronic equipment of the present invention, the photoelectric encoder detects the passing of the light-on portion and the light-off portion of the moving object with high accuracy. Therefore, appropriate operation can be carried out by using the detection result.

In another aspect, the photoelectric encoder of the present invention comprises:

a light-emitting device;

a plurality of light-receiving devices which are arranged in one direction in a region that light from the light-emitting device can reach; and a moving object that has a light-on portion and a light-off portion, which alternately pass through a prescribed position corresponding to each of the light-receiving devices along the one direction and produces a state in which the light is incident on the light-receiving device and a state in which the light is not incident on the light-receiving device, respectively, when the portions pass through the position, in which an output of each of the light-receiving devices takes a value corresponding to incidence of light or nonincidence of light from the light-emitting device on the light-receiving device, and further comprises:

a logical operating section for forming an output signal that has a frequency different from the movement frequency through operation of logical values expressed by the outputs of the light-receiving devices.

Furthermore, in an aspect in which the photoelectric encoder is limited to a light transmission type, the following structure is provided. That is, the photoelectric encoder of the light transmission type of the present invention comprises:

a light-emitting device;

a plurality of light-receiving devices that face the light-emitting device and are arranged in one direction; and a moving object having a light-transmitting portion and a light-shielding portion that alternately pass between the light-emitting device and each of the light-receiving devices at a prescribed movement frequency along the one direction, in which an output of each of the light-receiving devices takes a value corresponding to an event that light from the light-emitting device is transmitted through the light-transmitting portion or an event that the light is shielded by the light-shielding portion, the event occurring on the light-receiving device, and further comprises:

a logical operating section for forming an output signal that has a frequency higher than the movement frequency through operation of logical values expressed by the outputs of the light-receiving devices.

In the photoelectric encoder of the light transmission type of the present invention, the light-transmitting portion and the light-shielding portion of the moving object alternately pass at the prescribed movement frequency between the light-emitting device and each of the light-receiving devices along one direction in which the light-receiving devices are arranged. In accordance with the passing of the light-transmitting portion and the light-shielding portion of the moving object sequentially through the position corresponding to the plurality of light-receiving devices, the output values of the plurality of light-receiving devices sequentially change. Then, the logical operating section forms an output signal that has a frequency higher than the movement frequency by carrying out operation of the logical values expressed by the outputs of the light-receiving devices. Therefore, the resolution can be improved, and the movement information of the moving speed and the moving direction of the moving object can be obtained more accurately. Moreover, since this is possible even with the pitch of the light-transmitting portions maintained regardless of the pitch of the light-transmitting portions provided at the moving object, the problems of a reduction in the SN ratio and the crosstalk do not occur.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
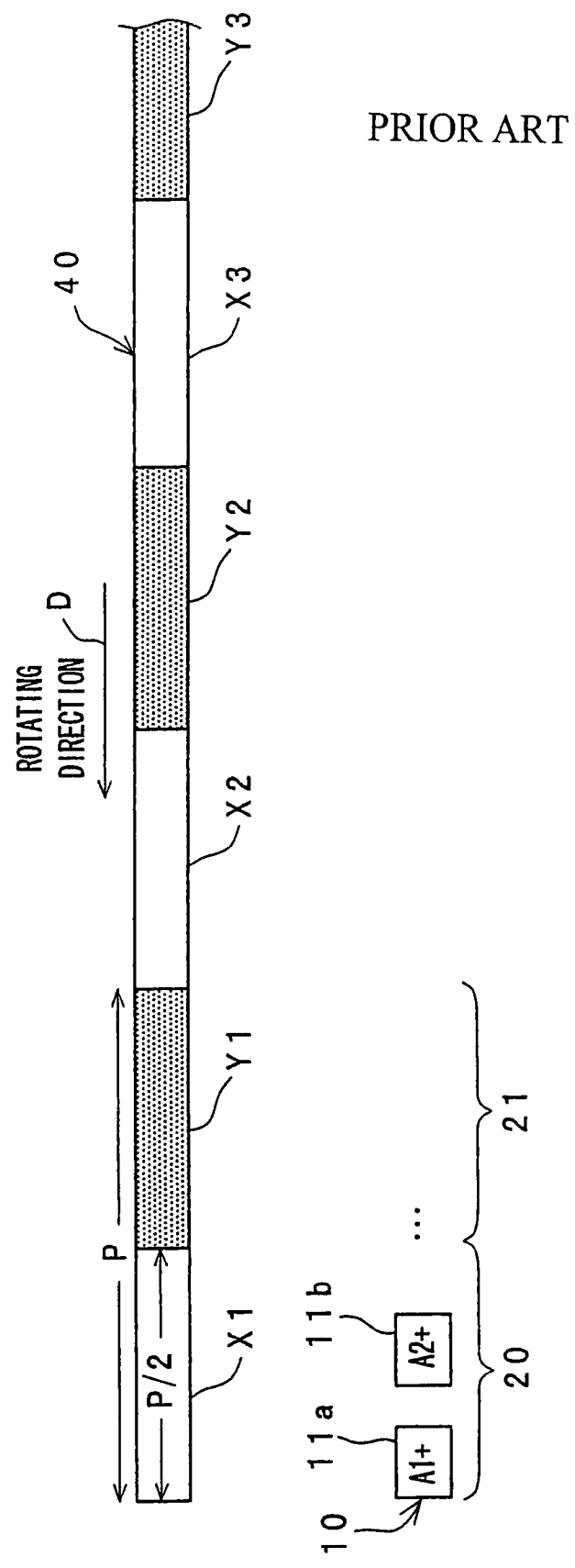
FIG. 1 is a view schematically showing the arrangement of a moving object and a light-receiving device in a photoelectric encoder of one embodiment of the present invention.

The present invention will be described in detail below by the embodiments shown in the drawings.

Figure 10:
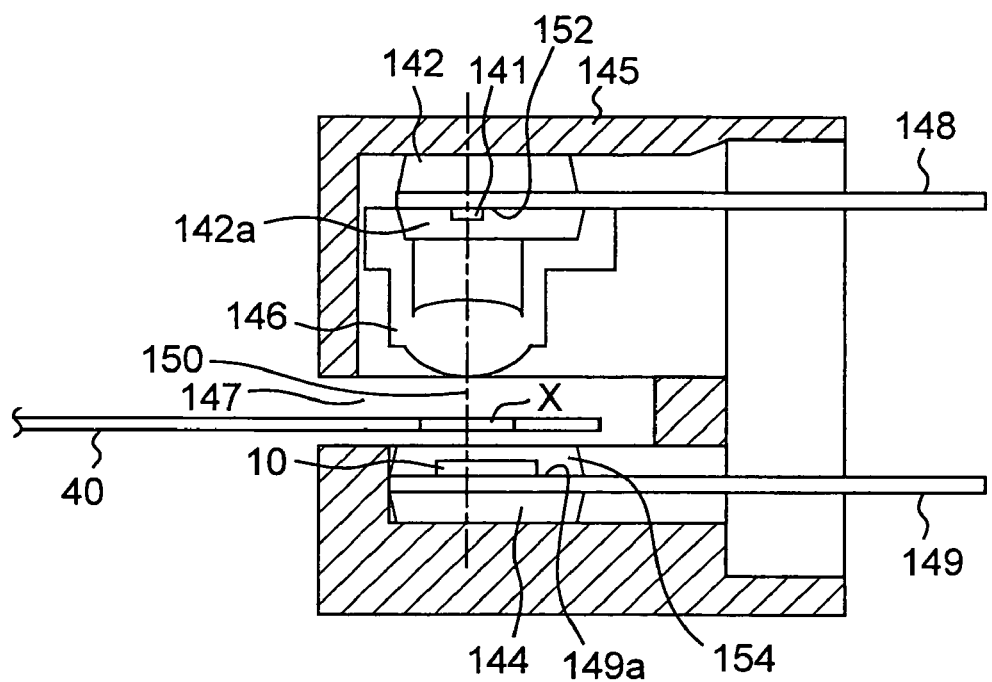
FIG. 10 is a view showing the construction of a detection section of the photoelectric encoder of one embodiment.
Figure 11:
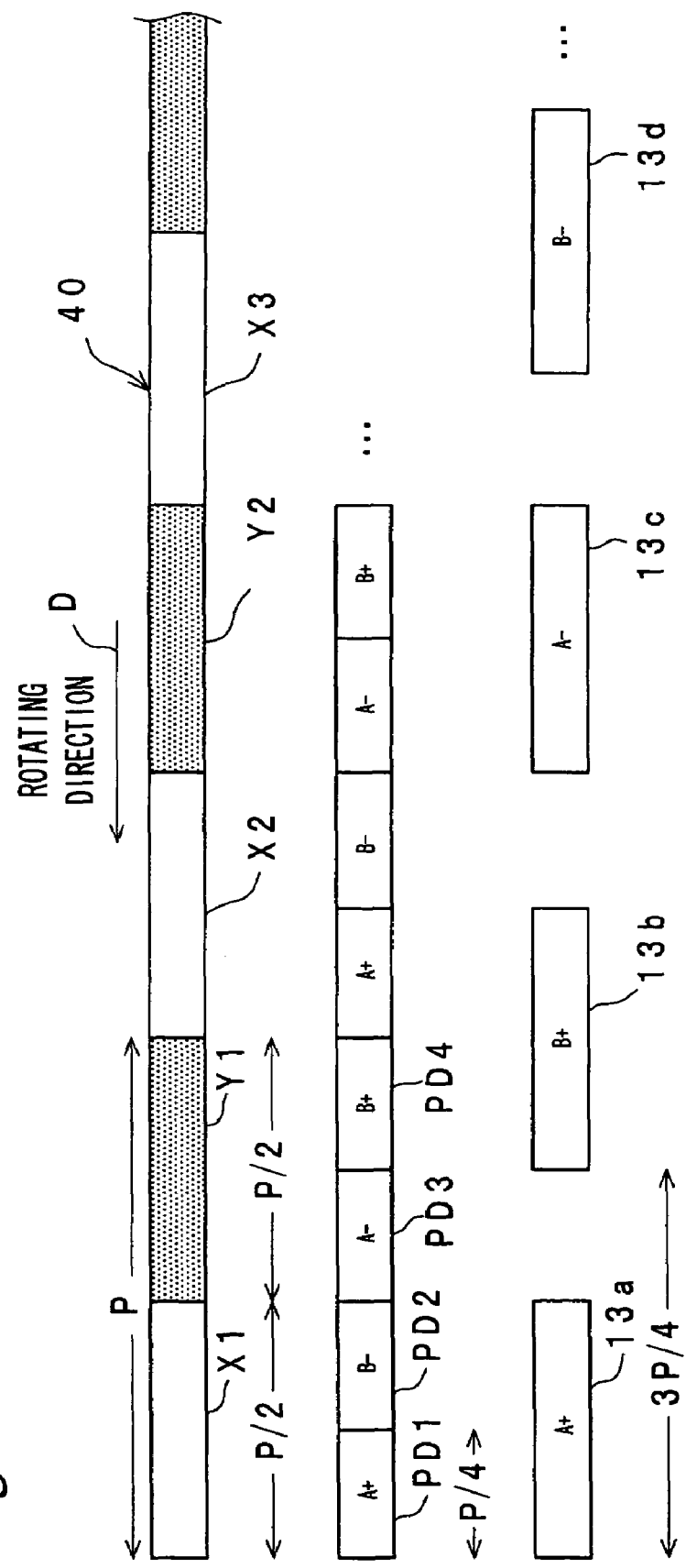
FIG. 11 is a view schematically showing the arrangement of a moving object and light-receiving devices in the photoelectric encoder of a prior art example.
Figure 12A:
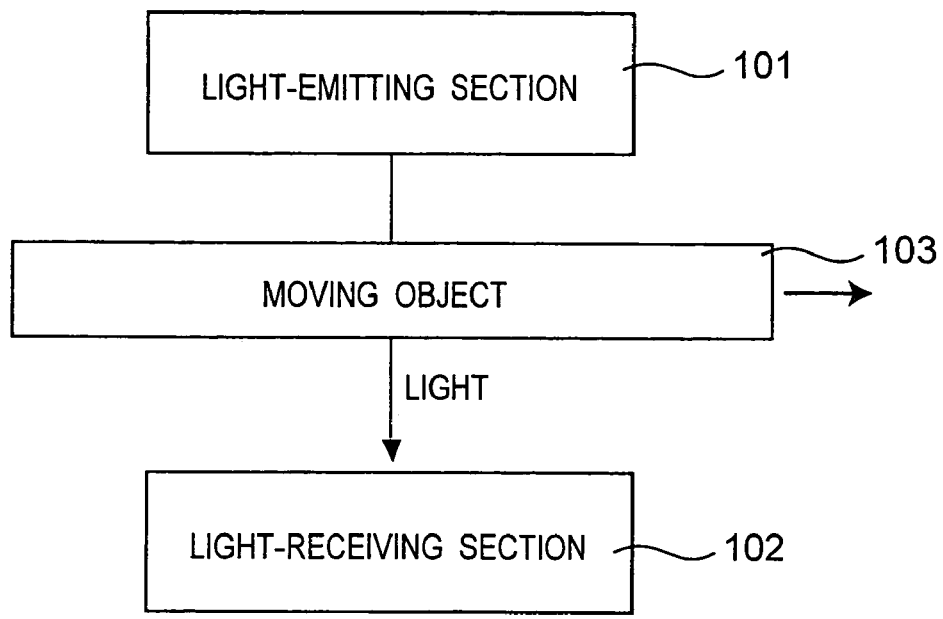
FIG. 12A is a diagram schematically showing the spatial arrangement of a moving object, a light-emitting section and a light-receiving section in a photoelectric encoder of the light transmission type.
Figure 12B:
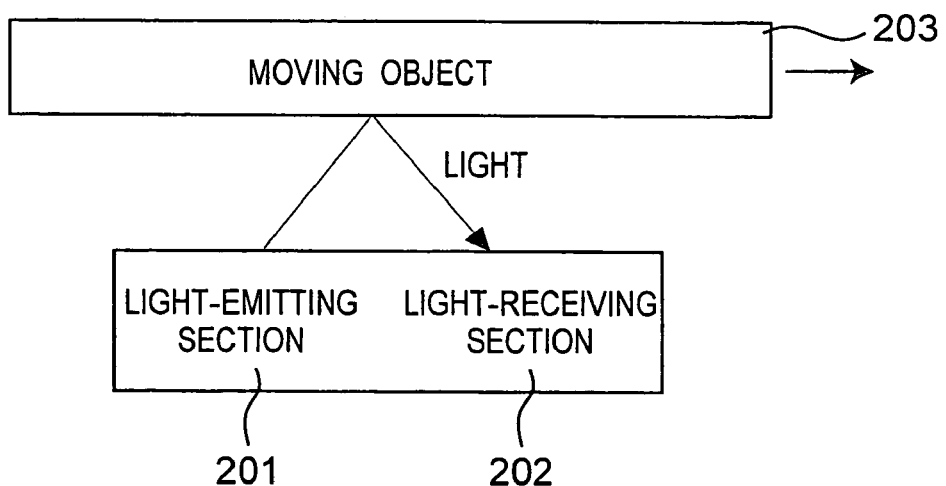
FIG. 12B is a diagram schematically showing the spatial arrangement of a moving object, a light-emitting section and a light-receiving section in a photoelectric encoder of the light reflection type.

FIG. 10 shows the cross section of the detection section of the photoelectric encoder of the light transmission type of one embodiment. In the photoelectric encoder, a light-emitting section 142 is lodged on one side (upper side in FIG. 10) of a casing 145 that has a slot 147 at an approximate center, and a light-receiving section 144 is lodged on the other side (lower side in FIG. 10). With this arrangement, the light-emitting section 142 and the light-receiving section 144 face each other. The light-emitting section 142 is constituted by mounting a semiconductor light-emitting chip 141 that serves as a light-emitting device on a header portion 148a of a lead frame 148 and sealing the same with a transparent resin 152. The light-receiving section 144 is constituted by mounting a semiconductor light-receiving chip 10 that includes a plurality of light-receiving devices on the header portion 149a of a lead frame 149 and sealing the same with a transparent resin 154. A collimating lens 146 for making parallel the light emitted from the light-emitting section 142 is arranged in front of the light-emitting section 142 on an optical axis 150 that connects the semiconductor light-emitting chip 141 with the semiconductor light-receiving chip 10. A disk-shaped moving object 40 that has a plurality of slits (collectively denoted by the reference letter X) as the light-on portion is inserted in the slot 147.

In operation, the moving object 40 is rotated at a constant speed around the central axis (not shown) parallel to the optical axis 150. The light-emitting chip 141 is electrified through the lead frame 148 to make the light-emitting chip 141 emit light, and the light is emitted along the optical axis 150 via the collimating lens 146. The light-receiving chip 10 photoelectrically converts the light incident through the slit X of the moving object 40 and outputs a signal corresponding to the quantity of incident light. The output of the light-receiving chip 10 is processed by a comparing section and a logical operating section as described later.

It is noted that the light-receiving chip 10 is divided into a plurality of light-receiving devices in the following examples (the devices may be a plurality of photodetection regions in a single chip).

At the top of FIG. 1, the portions where slits X1, X2, . . . of the moving object 40 are provided are schematically shown, which are viewed perpendicularly to the plate surface. The portions where the plate material exists between the slits X1, X2, . . . constitute light-off portions Y1, Y2, . . . where no light is made incident on the light-receiving chip 10. At the bottom of FIG. 1, the light-receiving chip 10 (divided light-receiving devices are indicated by reference numerals 11a, 11b, . . . ) is schematically shown. In FIG. 1, the rotating direction D of the moving object 40 is indicated as a straight line in approximation (the same thing can be said for the following figures). The moving object 40 has the slits X1, X2, . . . and the light-off portions Y1, Y2, . . . alternately at a constant pitch P along the rotating direction D. The slits X1, X2, . . . and the light-off portions Y1, Y2, . . . have the same dimension of 1/2 pitch (i.e., P/2) in the rotating direction D. With this arrangement, same number of light-receiving devices can be arranged in a region 20 corresponding to the slit X1 (referred to as a "slit corresponding region") and a region 21 corresponding to the light-off portion Y1 (referred to as a "light-off portion corresponding region") in the rotating direction D.

In the example of FIG. 1, a plurality of the light-receiving devices 11a, 11b, . . . , are arranged at a constant pitch along the rotating direction D in the slit corresponding region 20. The light-receiving devices 11a, 11b, . . . , have same dimension along the rotating direction D.

When the moving object 40 is rotated at a constant speed as described above in operation, the slits X1, X2, . . . and the light-off portions Y1, Y2, . . . alternately pass at a constant movement frequency (assumed to be f) along the rotating direction D with respect to the light-receiving devices 11a, 11b, . . . In counting the movement frequency f, the individual slits X1, X2, . . . are not distinguished, and it is assumed that the passing of any one of the slits X1, X2, . . . is counted one time.

Figure 2:
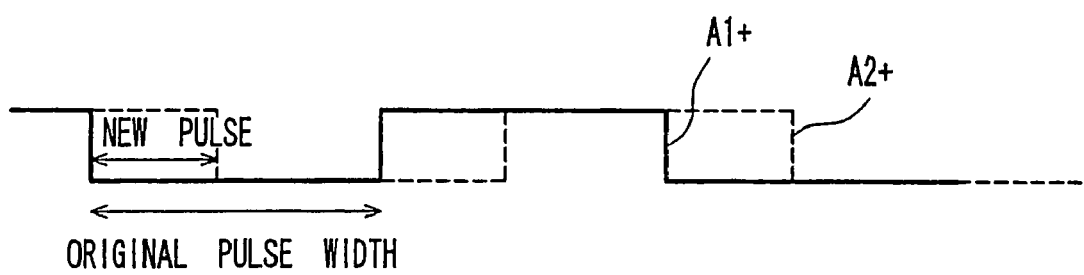
FIG. 2 is a view showing the outputs of the light-receiving devices in FIG. 1 and output signals obtained through operation of logical values expressed by the outputs.
Figure 13:
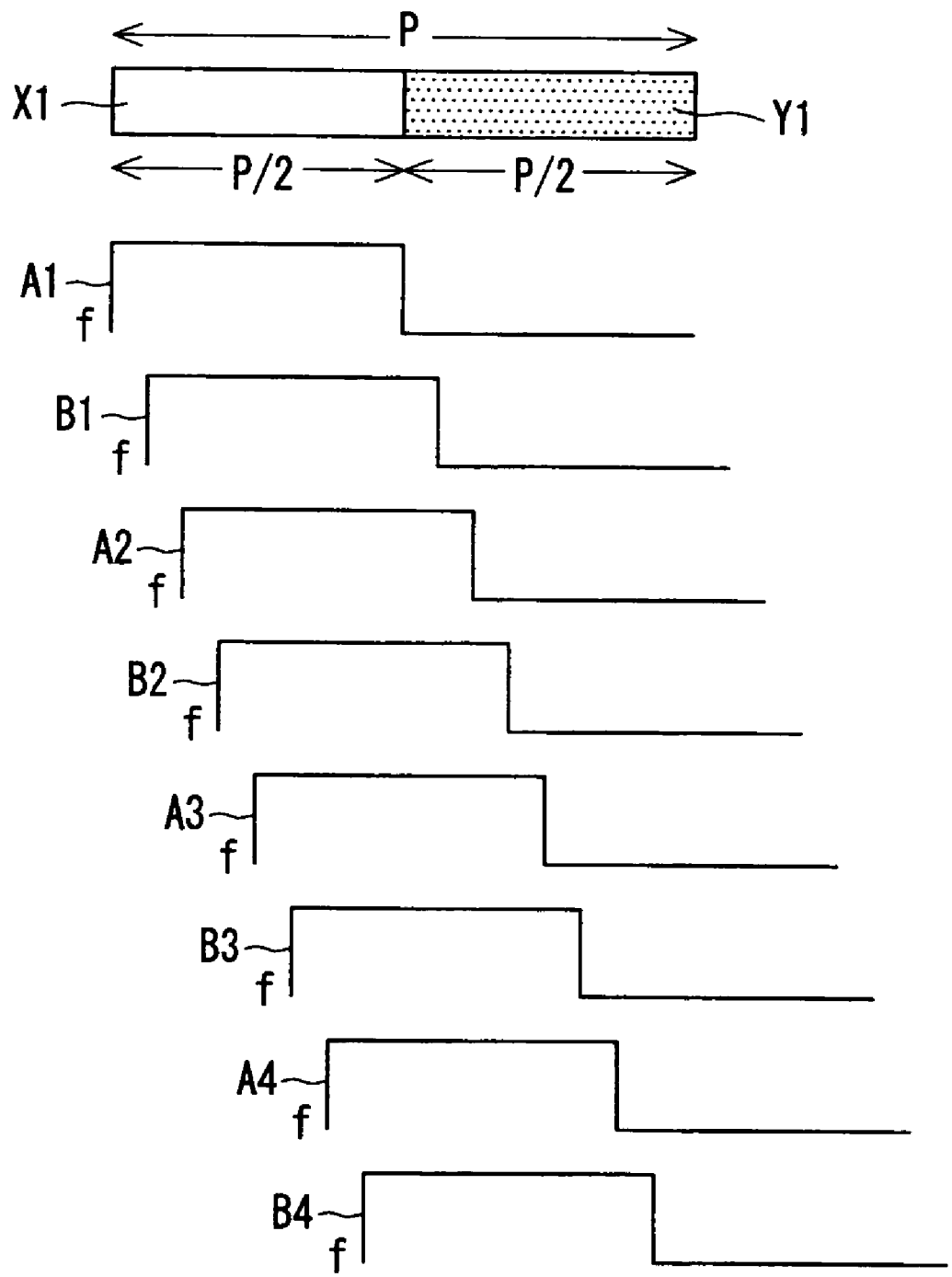
FIG. 13 is a view schematically showing the waveforms of signals obtained from the outputs of the eight light-receiving devices of FIG. 7.
Figure 14:
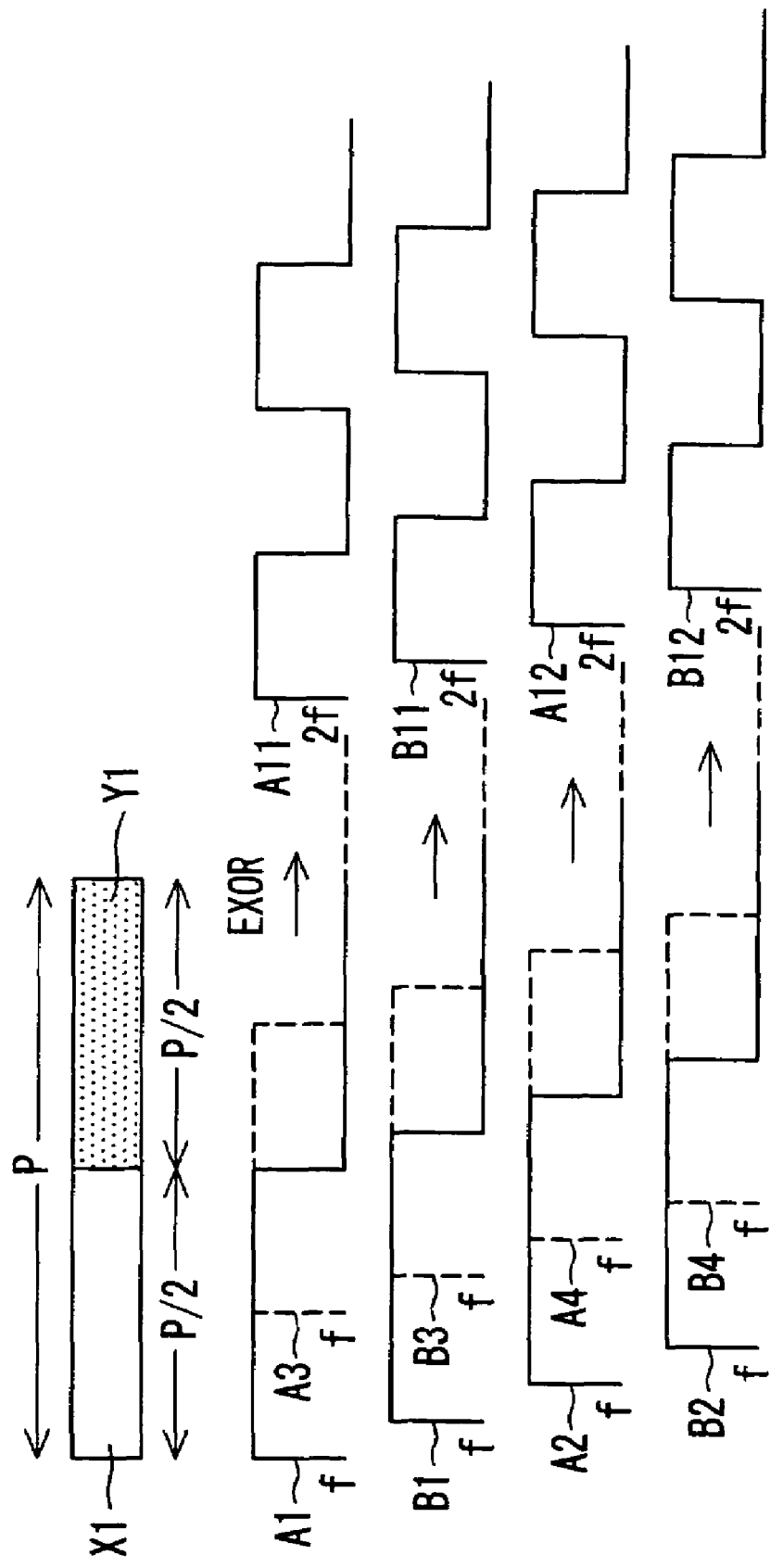
FIG. 14 is a view for schematically explaining the logical operation carried out by using the signals in FIG. 13.

At this time, as shown in FIG. 2, outputs A1+, A2+, . . . of the light-receiving devices 11a, 11b, . . . take a high-level value corresponding to the transmission of light from the light-emitting chip 41 through the slits X1, X2, . . . of the moving object 40 or a low-level value corresponding to the interruption of light by the light-off portions Y1, Y2, . . . with respect to the light-receiving devices. Then, the outputs A1+, A2+, . . . change at a constant frequency equal to the movement frequency f and with mutually different phases. The present invention intends to obtain an output signal that has a frequency higher than the movement frequency f by carrying out operation of the logical values (high level is assumed to be logic 1, and low-level is assumed to be logic 0) expressed by the plurality of outputs A1+, A2+, . . . For example, as shown in FIG. 13, it is assumed that eight signals A1, B1, A2, B2, . . . A4, B4 that have the same frequency (movement frequency f) and sequentially different phases depending on the light-receiving devices are obtained. As shown in FIG. 14, the signals are combined by twos in the combinations of (A1, A3) (B1, B3) (A2, A4) (B2, B4) in this example, and the respective exclusive-OR's (EXOR's) are taken. As a result, four signals A11, B11, A12 and B12, which have a double frequency 2f and phases mutually different by 45°, can be obtained. As described above, by taking an exclusive-OR (EXOR), an output signal of a frequency higher than the movement frequency f can easily be formed. It is noted that the duty ratio of each signal in FIGS. 13 and 14 is 1/2 (i.e., high-level period low-level period=1:1).

Figure 3:
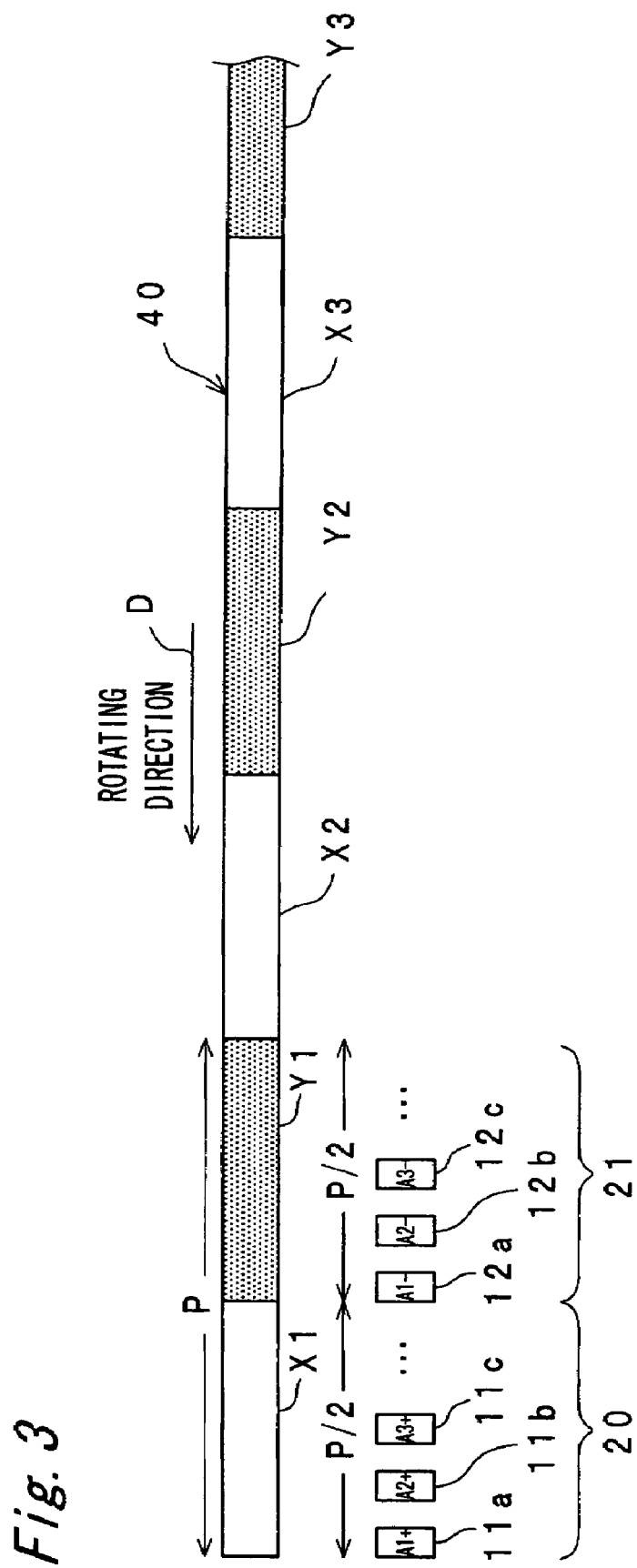
FIG. 3 is a view schematically showing a state in which the light-receiving devices are arranged in a slit corresponding region and a light-off portion corresponding region.

FIG. 3 shows an example in which same number of light-receiving devices are arranged in the slit corresponding region 20 and the light-off portion corresponding region 21 in the rotating direction D. With this arrangement, by taking a difference between the outputs A1+, A2+, . . . of the light-receiving devices 11a, 11b, . . . arranged in the slit corresponding region 20 and the outputs A1−, A2−, . . . of the light-receiving devices 12a, 12b, . . . arranged in the light-off portion corresponding region 21, the background noise can be removed. Therefore, the passing of the slits X1, X2, . . . and the light-off portions Y1, Y2, . . . of the moving object 40 can be detected with high accuracy.

Figure 4:
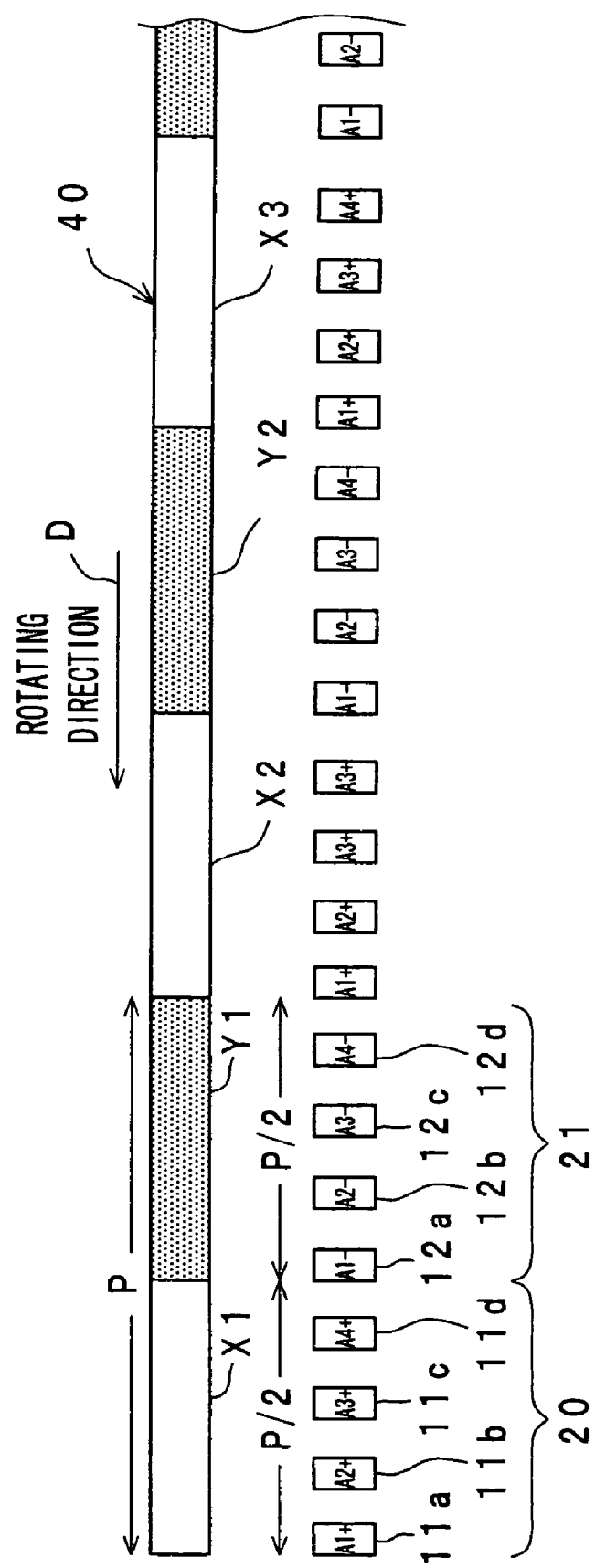
FIG. 4 is a view schematically showing a state in which four light-receiving devices are arranged in each of the slit corresponding region and the light-off portion corresponding region.
Figure 5:
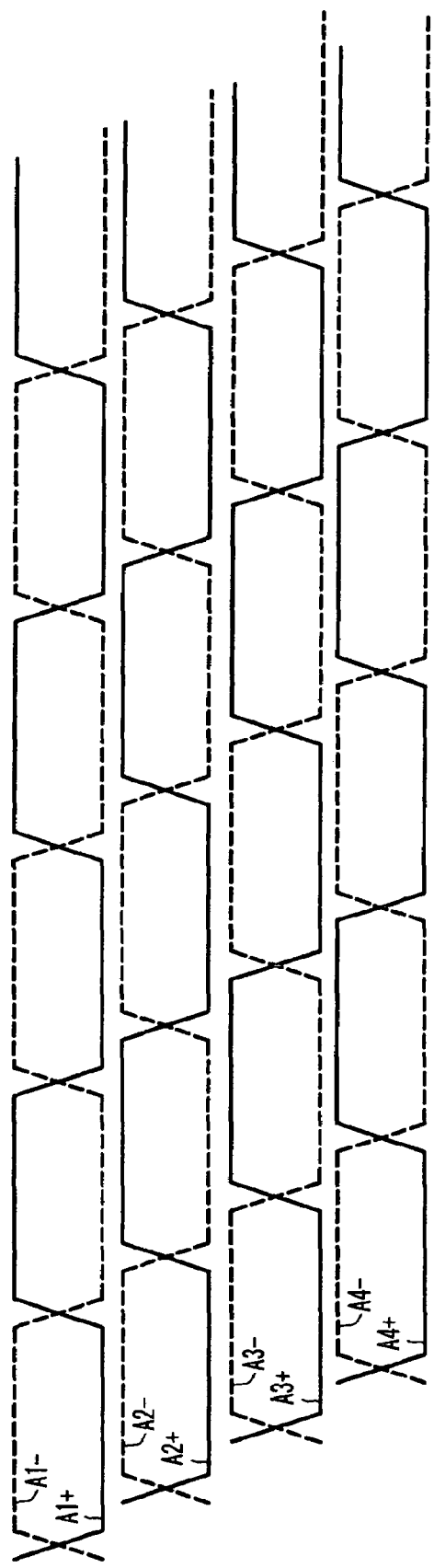
FIG. 5 is a view showing the outputs of the light-receiving devices in FIG. 4.

FIG. 4 shows an example in which the regularity (constant pitch and same dimension) of the arrangement of the light-receiving devices described with reference to FIGS. 1 and 3 is provided, and more concretely arranged are four light-receiving devices 11a, 11b, 11c and 11d in the slit corresponding region 20 and four light-receiving devices 12a, 12b, 12c and 12d in the light-off portion corresponding region 21. The light-receiving devices 11a, 11b, 11c and 11d output the signals A1+, A2+, A3+ and A4+, and the light-receiving devices 12a, 12b, 12c and 12d output the signals A1−, A2−, A3− and A4−. As shown in FIG. 5, the outputs A1+, A2+, A3+ and A4+ of the plurality of light-receiving devices 11a, 11b, 11c and 11d arranged in the slit corresponding region 20 sequentially change at a constant movement frequency f and with phases mutually different by prescribed angles. Likewise, the outputs A1−, A2−, A3− and A4− of the light-receiving devices 12a, 12b, 12c and 12d arranged in the light-off portion corresponding region 21 sequentially change at the constant movement frequency f and with phases mutually different by prescribed angles. The outputs A1+, A2+, A3+ and A4+ and the outputs A1−, A2−, A3− and A4− have phases mutually different by 180°. That is, the phases are inverted.

Figure 6:
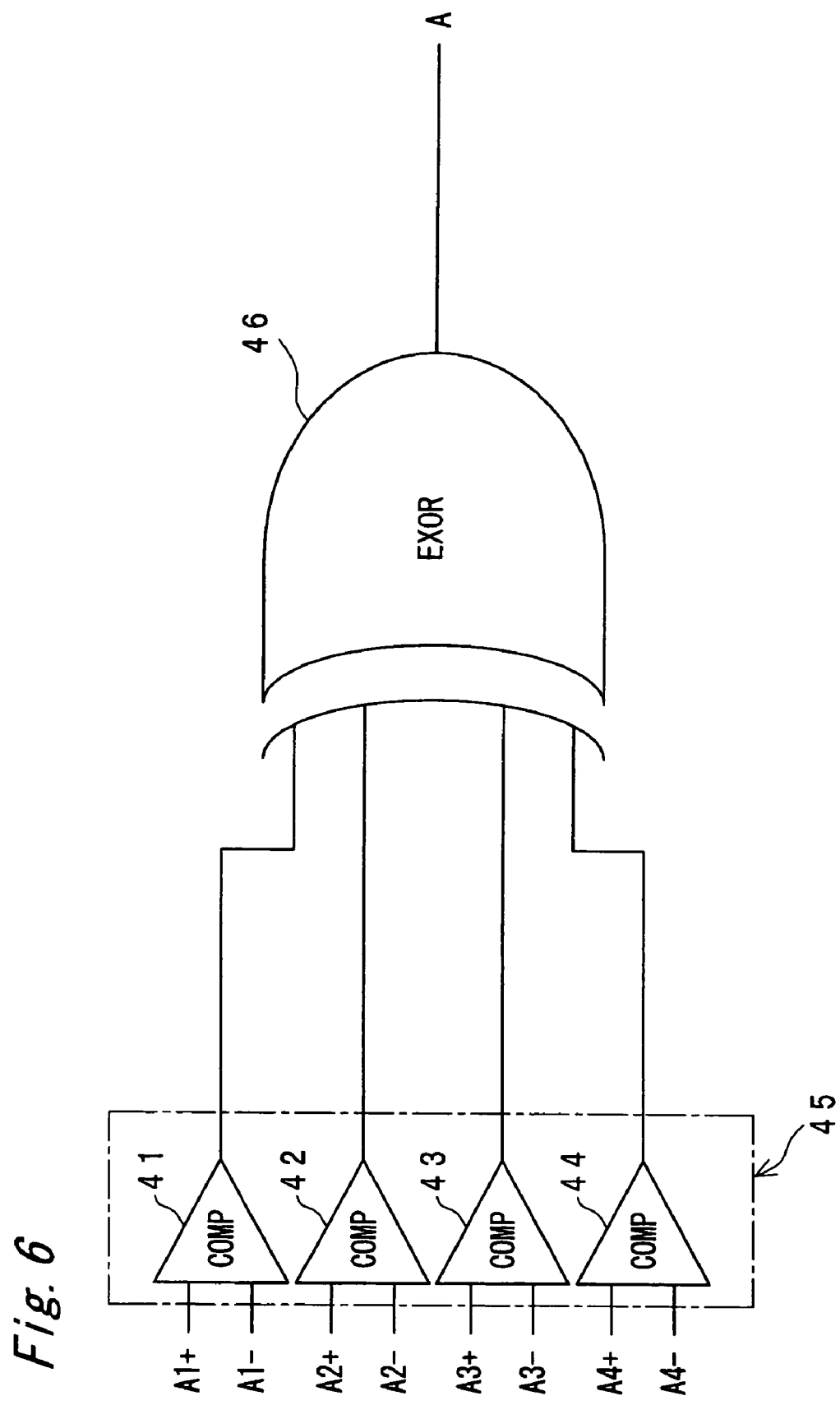
FIG. 6 is a diagram showing the construction of a comparing section and a logic circuit section provided for the photoelectric encoder of one embodiment.

FIG. 6 shows a comparing section 45 that processes the outputs of the light-receiving devices and a logic circuit section 46 as a logical operating section that receives the outputs of the comparing section 45 through a digital conversion circuit (not shown).

The comparing section 45 includes four comparators 41, 42, 43 and 44. The comparator 41 takes a difference between the outputs A1+, A1− of the light-receiving devices 11a and 12a, the comparator 42 takes a difference between the outputs A2+, A2− of the light-receiving devices 11b and 12b, the comparator 43 takes a difference between the outputs A3+, A3− of the light-receiving devices 11c and 12c, and the comparator 44 takes a difference between the outputs A4+, A4− of the light-receiving devices 11d and 12d. That is, in this example, the light-receiving devices 11a, 11b, 11c and 11d arranged in the slit corresponding region 20 and the light-receiving devices 12a, 12b, 12c and 12d arranged in the light-off portion corresponding region 21 are made to correspond to each other one to one in order of arrangement in the rotating direction D. Moreover, the outputs A1−, A2−, A3− and A4− that have a negative sign serve as reference inputs. That is, the outputs A1−, A2−, A3− and A4− are subtracted from the outputs A1+, A2+, A3+ and A4+, respectively. By thus taking differences by the comparators 41, 42, 43 and 44, the background noise can be removed. Therefore, the passing of the slits X1, X2, . . . and the light-off portions Y1, Y2, . . . of the moving object 40 can be detected with high accuracy.

The logic circuit section 46 is constructed of an exclusive-OR circuit that takes an exclusive-OR (EXOR) of the logical values expressed by the outputs of the comparators 41, 42, 43 and 44. The output of the exclusive-OR changes from logic 1, logic 0, logic 1, . . . as the number of inputs of logic 1 changes from an odd number, an even number, an odd number, . . . Therefore, an output signal A of a frequency higher than the movement frequency f can easily be formed. In this four-input example, an output signal A having a frequency 4f that is four times as high as the movement frequency f can be formed. Moreover, based on the regularity (constant pitch and same dimension) of the arrangement of the light-receiving devices, the output signal A comes to have a constant duty ratio.

Figure 7:
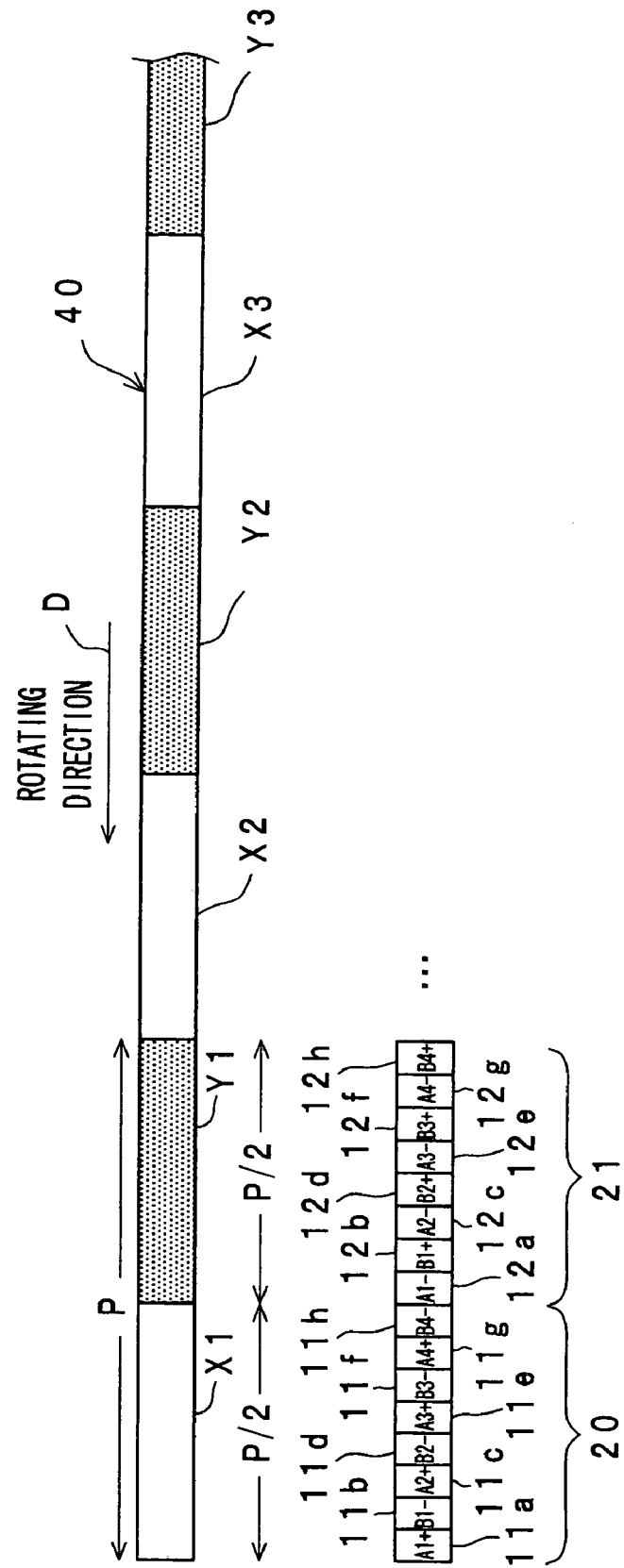
FIG. 7 is a view showing a state in which eight light-receiving devices are arranged in each of the slit corresponding region and the light-off portion corresponding region, and the light-receiving devices are distributed into two groups alternately in order of arrangement along the rotating direction of the moving object.

FIG. 7 shows an example in which the regularity (constant pitch and same dimension) of the arrangement of the light-receiving devices described with reference to FIGS. 1 and 3 is provided, and more concretely arranged are eight light-receiving devices 11a, 11b, 11c, 11d, 11e, 11f, 11g and 11h in the slit corresponding region 20 and eight light-receiving devices 12a, 12b, 12c, 12d, 12e, 12f, 12g and 12h in the light-off portion corresponding region 21. The light-receiving devices 11a, 11b, 11c, 11d, 11e, 11f, 11g and 11h output signals A1+, B1−, A2+, B2−, A3+, B3−, A4+ and B4−, respectively, and the light-receiving devices 12a, 12b, 12c, 12d, 12e, 12f, 12g and 12h output signals A1−, B1+, A2−, B2+, A3−, B3+, A4− and B4+.

In this example, the comparing section 45 shown in FIG. 6 takes a difference between the outputs A1+ and A1− of the light-receiving device pair 11a and 12a, a difference between the outputs A2+ and A2− of the light-receiving device pair 11c and 12c, a difference between the outputs A3+ and A3− of the light-receiving device pair 11e and 12e, and a difference between the outputs A4+ and A4− of the light-receiving device pair 11g and 12g. Then, the logic circuit section 46 shown in FIG. 6 takes an exclusive-OR (EXOR) of the logical values expressed by the outputs of the four comparators 41, 42, 43 and 44. As a result, an output signal A having a frequency 4f that is four times as high as the movement frequency f is formed.

Moreover, by a comparing section having the same construction as that of the comparing section 45 shown in FIG. 6 takes a difference between the outputs B1+ and B1− of the light-receiving device pair 12b and 11b, a difference between the outputs B2+ and B2− of the light-receiving device pair 12d and 11d, a difference between the outputs B3+ and B3− of the light-receiving device pair 12f and 11f, and a difference between the outputs B4+ and B4− of the light-receiving device pair 12h and 11h. Then, a logic circuit section of the same construction as that of the logic circuit section 46 shown in FIG. 6 takes an exclusive-OR (EXOR) of the logical values expressed by the outputs of the comparing section (four comparators). As a result, an output signal B having a frequency 4f that is four times as high as the movement frequency f is formed.

Figure 8:
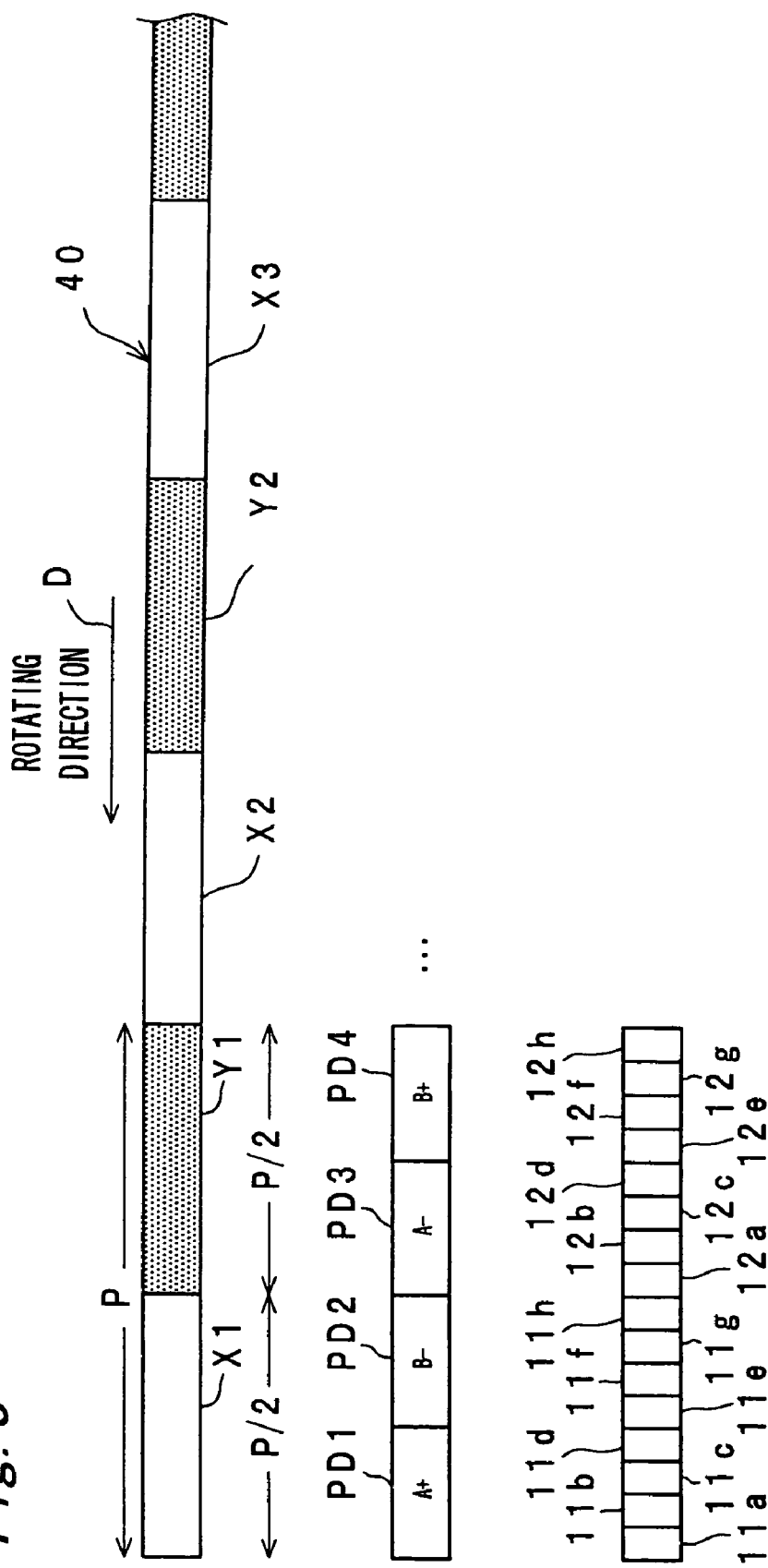
FIG. 8 is a view schematically showing by comparison the arrangement of the light-receiving devices in the prior art example and the arrangement of the light-receiving devices in one embodiment with respect to the moving object.
Figure 9:
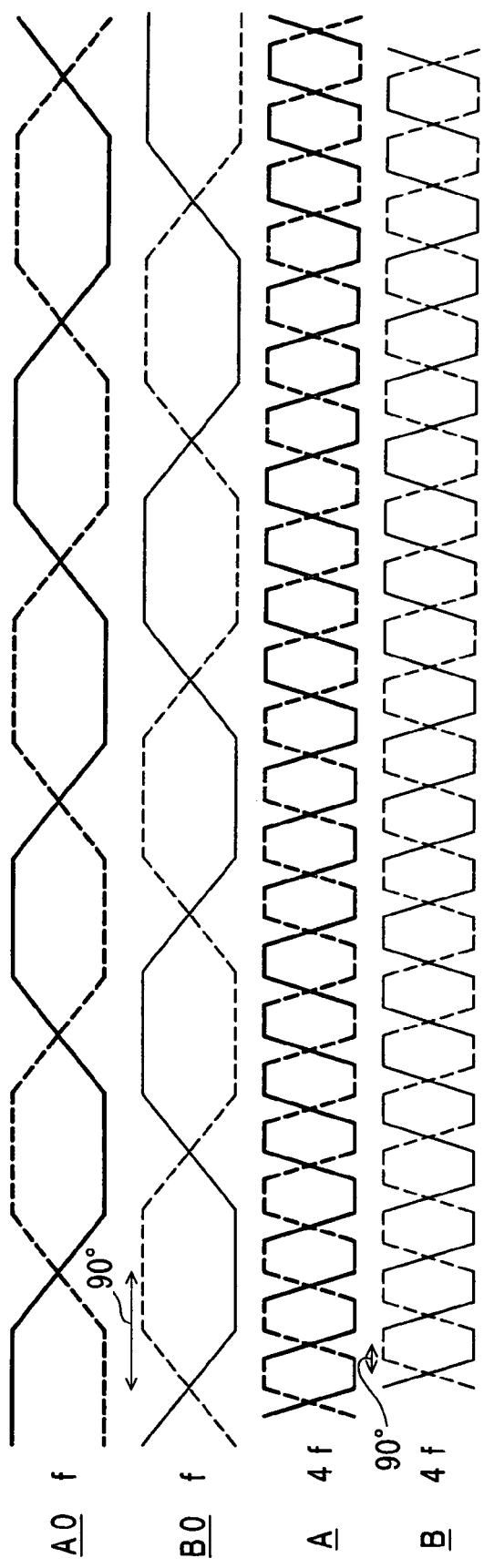
FIG. 9 is a view showing by comparison the outputs of the light-receiving devices in the prior art example shown in FIG. 8 and the outputs of the light-receiving devices in one embodiment.

The arrangement of the light-receiving devices (photodiode) of the prior art example shown in the middle of FIG. 1 is shown in the middle of FIG. 8, and the arrangement of the light-receiving devices shown in FIG. 7 is shown at the bottom of FIG. 8 by comparison to it. In the prior art example, as shown in FIG. 9, each of output signals A0 and B0 had the same frequency f as the movement frequency f and phases mutually different by 90°. In contrast to this, when the output of the light-receiving device is subjected to the processing in the arrangement (arrangement shown in FIG. 7) of the light-receiving devices shown at the bottom of FIG. 8, the output signals A and B come to have a frequency 4f that is four times as high as the movement frequency f and phases mutually different by 90°.

With this arrangement, the resolution can be improved, and the movement information of the moving speed, the moving direction and so on of the moving object 40 can be obtained more accurately. Moreover, since this is possible even with the pitch of the slits X1, X2, . . . maintained regardless of the pitch of the slits X1, X2, . . . provided at the moving object 40, the problems of the reduction in the SN ratio and the crosstalk do not occur.

In general, in the case where an exclusive-OR is taken when there are three or more logical values, operation is first carried out by selecting two logical values, and operation is carried out by adding another logical value to the operation result, the operations being repeated. Since the photoelectric encoder has various variation conditions such as variation in the quantity of light depending on the light-emitting chip 41 and assembly variation, the accuracy is increased by regularly carrying out the operation sequence.

In this case, the logic circuit section 46 should desirably take an exclusive-OR by successively adding the logical values expressed by the light-receiving devices 11a, 11b, . . . in order in which the light-receiving devices 11a, 11b, . . . adjoin in the rotating direction D. As a result, the obtained output signal becomes hard to receive the influence of the variation in the quantity of light depending on the light-emitting chip 41 and the like.

Moreover, the logic circuit section 46 may take an exclusive-OR by adding the logical values expressed by the light-receiving devices 11a, 11b, . . . in order from the light-receiving devices 11a, 11b, . . . arranged at opposite end portions inside the slit corresponding region 20 toward the light-receiving devices 11a, 11b, . . . arranged in the center portion alternately in the rotating direction D. Also, in this case, the obtained output signal becomes hard to receive the influence of the variation in the quantity of light depending on the light-emitting chip 41 and the like.

Explanation is next made to a case where the logical operation is carried out a plurality of times.

Figure 15:
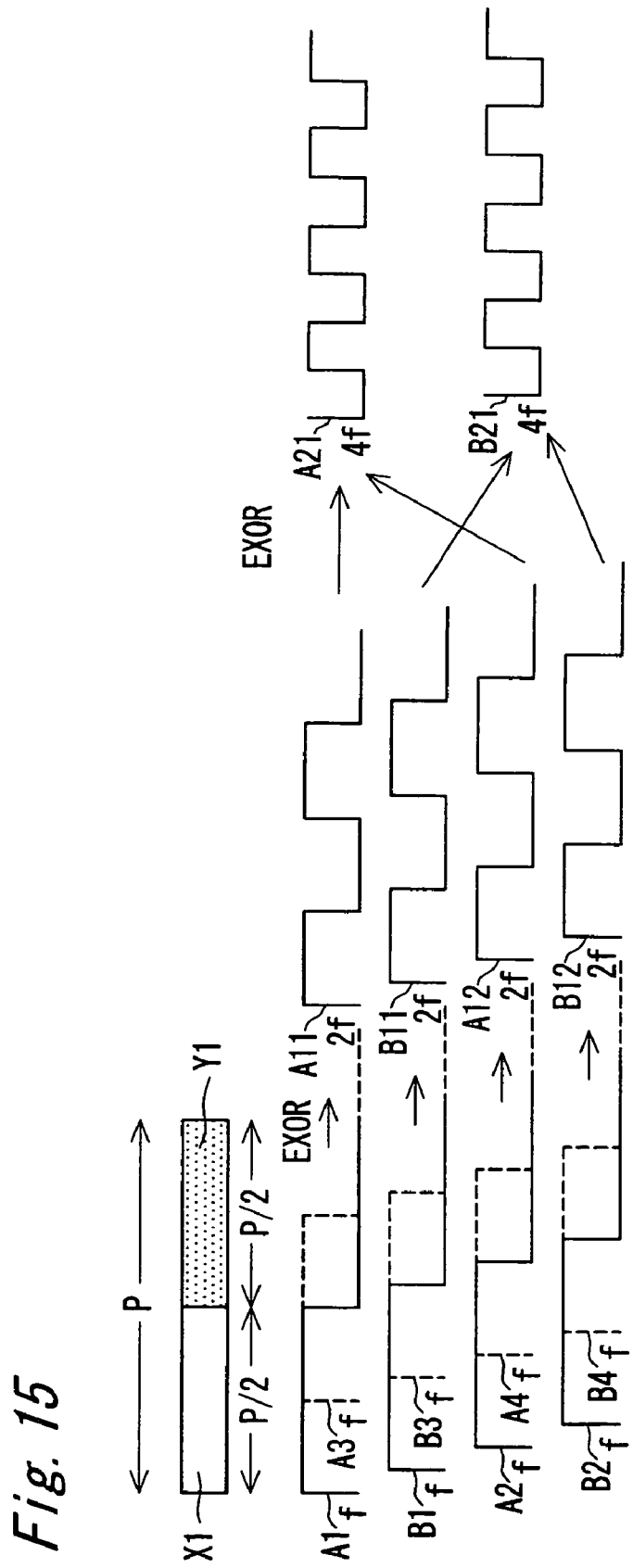
FIG. 15 is a view for schematically explaining the logical operation carried out by using the signals in FIG. 13.
Figure 16:
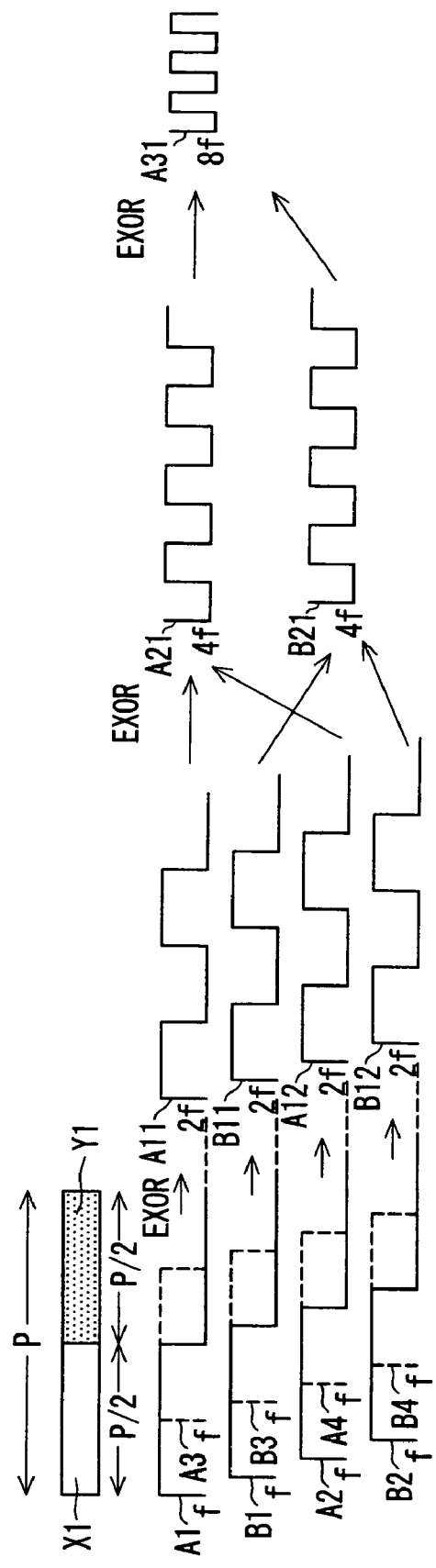
FIG. 16 is a view for schematically explaining the logical operation carried out by using the signals in FIG. 13.

For example, first, as shown in the left half of FIG. 15, an exclusive-OR (EXOR) is taken by combining eight signals A1, B1, A2, B2, . . . , A4, B4 that have same frequency (movement frequency f) and sequentially different phases obtained by the light-receiving devices by twos in, for example, the combinations of (A1, A3) (B1, B3) (A2, A4) (B2, B4) in this example. As a result, similar to the description with reference to FIG. 14, four signals A11, B11, A12 and B12, which have a double frequency and phases sequentially different by 45° are obtained. Subsequently, as shown in the right half of FIG. 15, an exclusive-OR (EXOR) is taken by combining the signals by twos in, for example, the combinations of (A11, A12) (B11, B12) in this example. As a result, the two signals A21 and B21, which have a frequency 4f that is four times the original movement frequency f and a phase mutually different by 90° are obtained. As described above, by taking the exclusive-OR two times, the frequency of the output signal can be increased, and the number of signals can be reduced. Further, as shown in FIG. 16, a signal A31 having a frequency 8f that is eight times the original movement frequency f can be formed by taking an exclusive-OR (EXOR) of the signals A21 and B21. It is noted that the duty ratios of the signals in FIGS. 15 and 16 are each 1/2 (i.e., high-level period:low-level period=1:1).

As described above, by taking an exclusive-OR (EXOR) of the signals that have phases mutually different by 90° a plurality of times, a signal that has a frequency double the original movement frequency can be obtained. Then, by repetitively carrying out the operation a plurality of times, a signal having a frequency that is integral multiple times the original movement frequency, or more in detail, $2^m$ times (note that m is a natural number) as high as the original movement frequency can be obtained.

Figure 17:
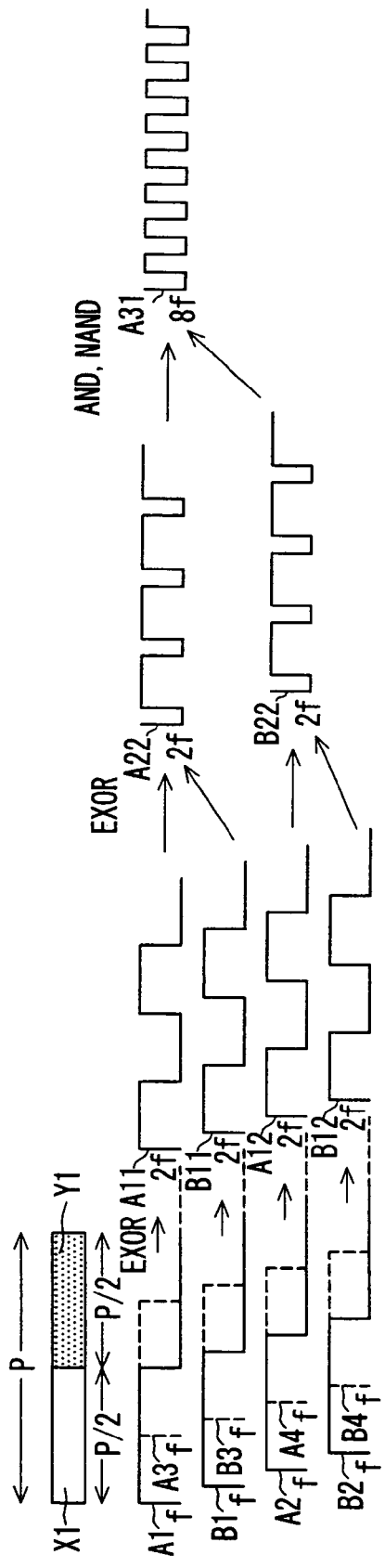
FIG. 17 is a view for schematically explaining the logical operation carried out by using the signals in FIG. 13.

Moreover, as shown in, for example, FIG. 17, it is acceptable to obtain four signals A11, B11, A12 and B12 that have a double frequency and phases sequentially different by 45° and thereafter take an exclusive-OR (EXOR) of the combinations of (A11, B11) (A12, B12) unlike the foregoing example. As a result, two signals A22 and B22 having a frequency 2f that is double the original movement frequency f and phases mutually different by 90° are obtained. It is noted that the duty ratios of the signals A22 and B22 are each 3/4 (i.e., high-level period:low-level period=3:1). Further, if the logical product (AND) or nonconjunction (NAND) of the signals A22 and B22 is taken, a signal A31 having a frequency 8f that is eight times the original movement frequency f can be formed.

Figure 18:
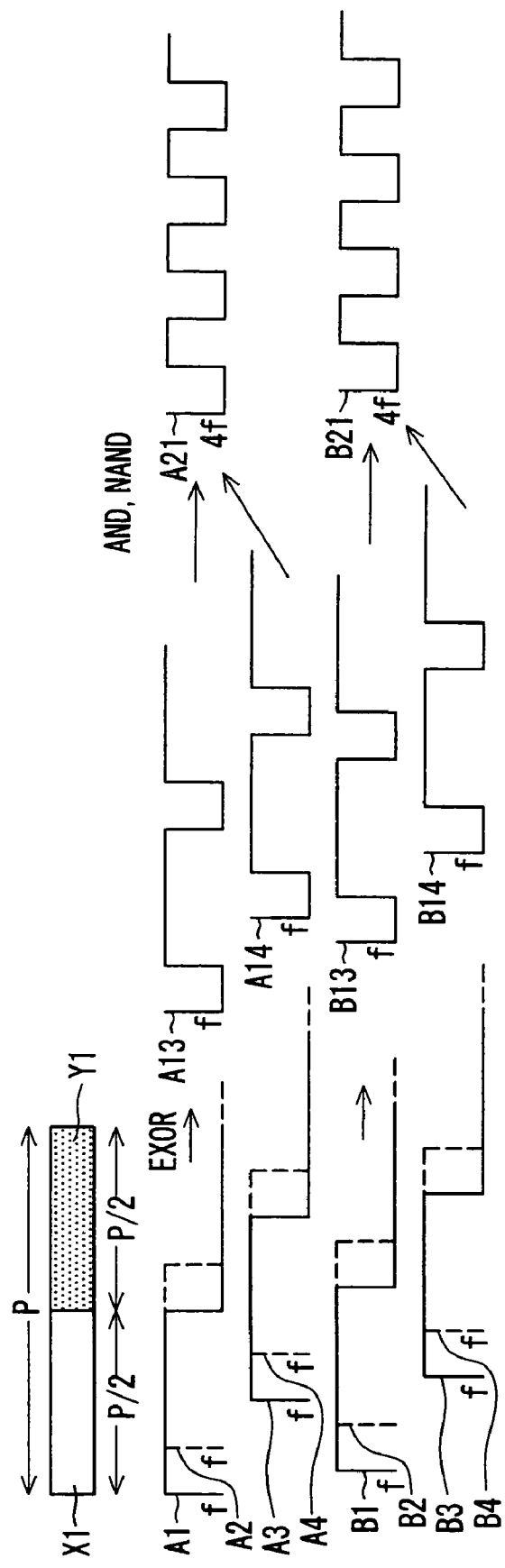
FIG. 18 is a view for schematically explaining the logical operation carried out by using the signals in FIG. 13.
Figure 19:
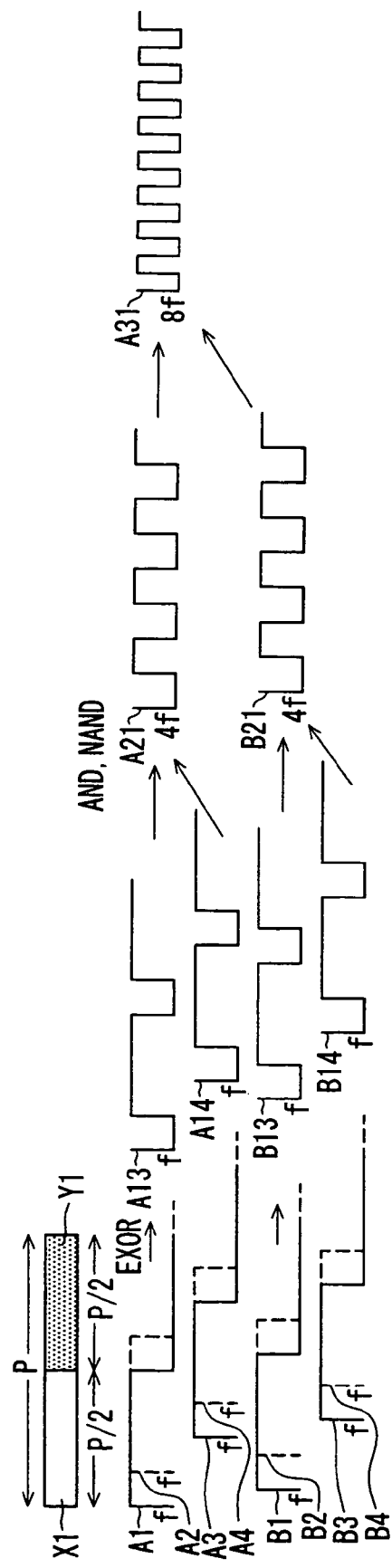
FIG. 19 is a view for schematically explaining the logical operation carried out by using the signals in FIG. 13.

Moreover, as shown in, for example, FIG. 18, it is acceptable to take an exclusive-OR (EXOR) by combining eight signals A1, B1, A2, B2, . . . , A4, B4 that have same frequency (movement frequency f) and phases sequentially different obtained by the light-receiving devices by twos in, for example, the combinations of (A1, A2) (A3, A4) (B1, B2) (B3, B4) in this example. As a result, four signals A13, A14, B13 and B14, which have the same frequency as the movement frequency f and different phases are obtained. That is, only the phase is different by 90° between the signals (A13, A14) and between the signals (B13, B14), and the phase is different by 67.5° between the signals (A13, B13). It is noted that the duty ratios of the signals A13, A14, B13 and B14 are each 3/4 (i.e., high-level period:low-level period=3:1). Next, the logical product (AND) or nonconjunction (NAND) is taken by combining the signals by twos, or in the combinations of (A13, A14) (B13, B14) in this example. As a result, two signals A21 and B21 having a frequency 4f that is four times the original movement frequency f and phases mutually different by 90° are obtained. Further, as shown in the right half of FIG. 19, it is possible to form a signal A31 having a frequency 8f that is eight times the original movement frequency f by taking an exclusive-OR (EXOR) of the signals A21 and B21.

As described above, by using the logical product (AND) or nonconjunction (NAND) in a certain stage of the logical operation, the logical operation becomes simpler than when the exclusive-OR is repetitively taken a plurality of times. Therefore, the number of devices that constitute the logical operating section can be reduced. As a result, signal processing becomes easy in an IC (Integrated Circuit) provided in a stage subsequent to the photoelectric encoder, and this is useful.

Figure 20:
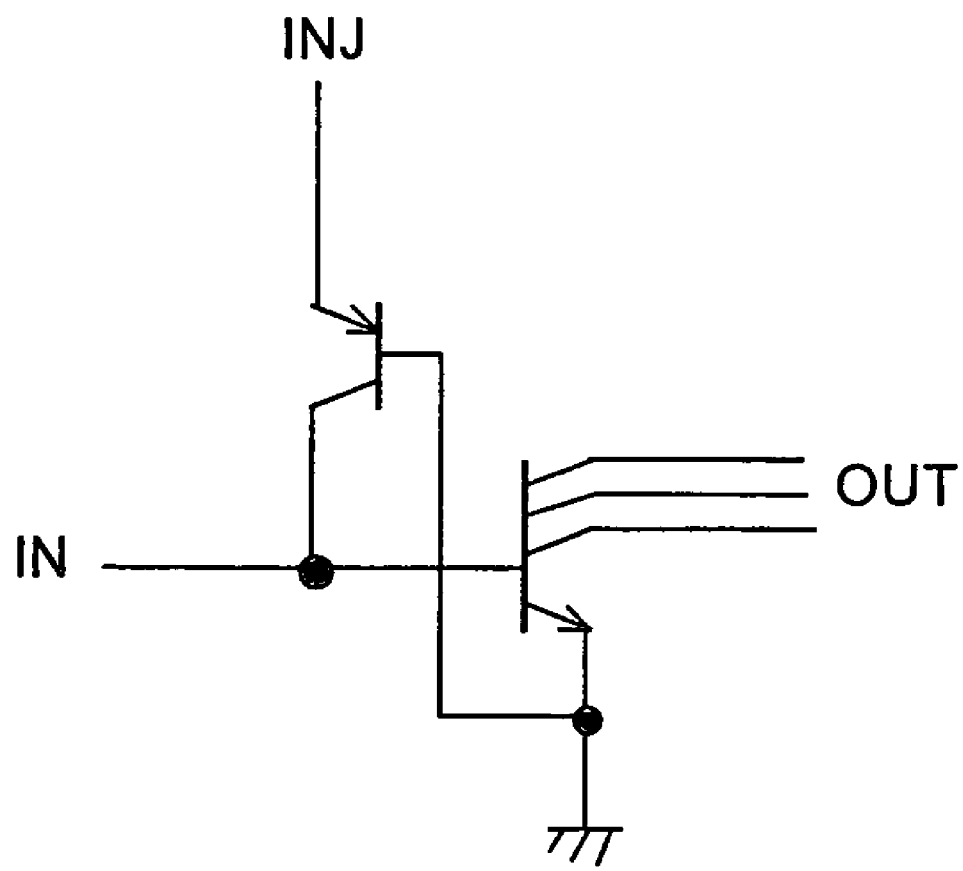
FIG. 20 is a diagram schematically showing the equivalent circuit of one IIL device.

The photoelectric encoder should desirably employ an integrated injection logic device (hereinafter referred to as IIL device) that has an equivalent circuit as shown in, for example, FIG. 20 as a constituent element of the logical operating section. With the arrangement, the logical operating section can easily be constituted of a bipolar IC. Therefore, it becomes easy to integrally manufacture the light-receiving device and the logical operating section. Moreover, since one device constitutes the NAND (nonconjunction) circuit in the IIL device, the construction of the logical operating section is simplified when the IIL device is employed.

Figure 21:
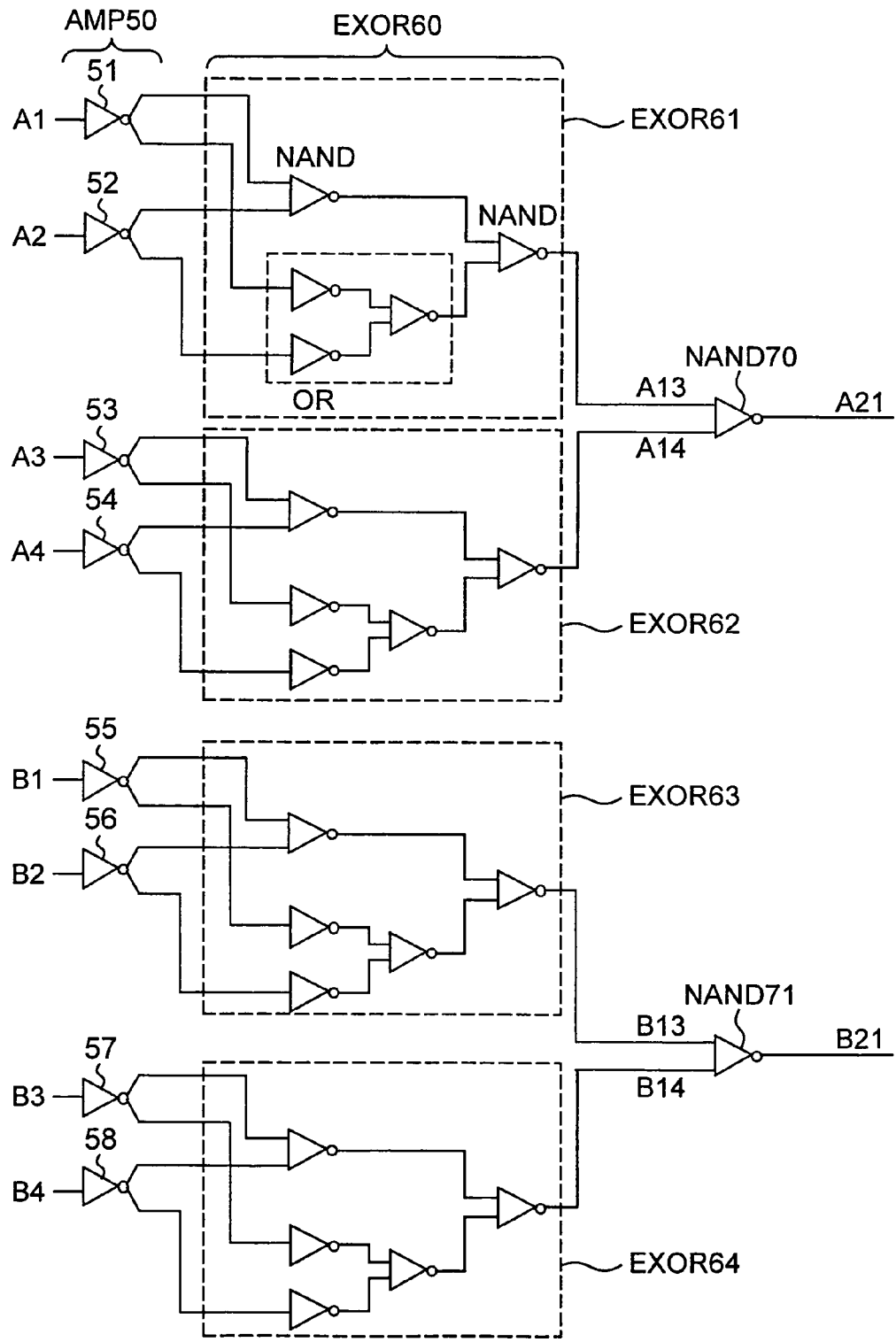
FIG. 21 is a block diagram showing the circuit construction of a logic circuit section constructed of IIL devices to execute the logical operation shown in FIG. 18.

For example, when the IIL device is employed as a constituent element of the logical operating section, the logical operation shown in FIG. 18 is provided by a circuit (logical operating section) as shown in FIG. 21. The logical operating section shown in FIG. 21 has an amplifier section (AMP) 50 that amplifies the signals A1, B1, A2, B2, . . . , A4, B4 obtained by the light-receiving devices, an exclusive-OR section (EXOR) 60 that takes an exclusive-OR and nonconjunction circuits (NAND) 70 and 71 that take nonconjunction. The amplifier section (AMP) 50 has amplifiers 51, 52, . . . , 58 for each signal, and the exclusive-OR section (EXOR) 60 has exclusive-OR circuits 61, 62, 63 and 64 for each of two signals (A1, A2) (A3, A4) (B1, B2) (B3, B4). Each of the exclusive-OR circuits 61, 62, 63 and 64 includes two nonconjunction circuits (NAND). Since each of the NAND circuits in FIG. 21 is constructed of one IIL device, the construction of the logical operating section is simplified.

Figure 23:
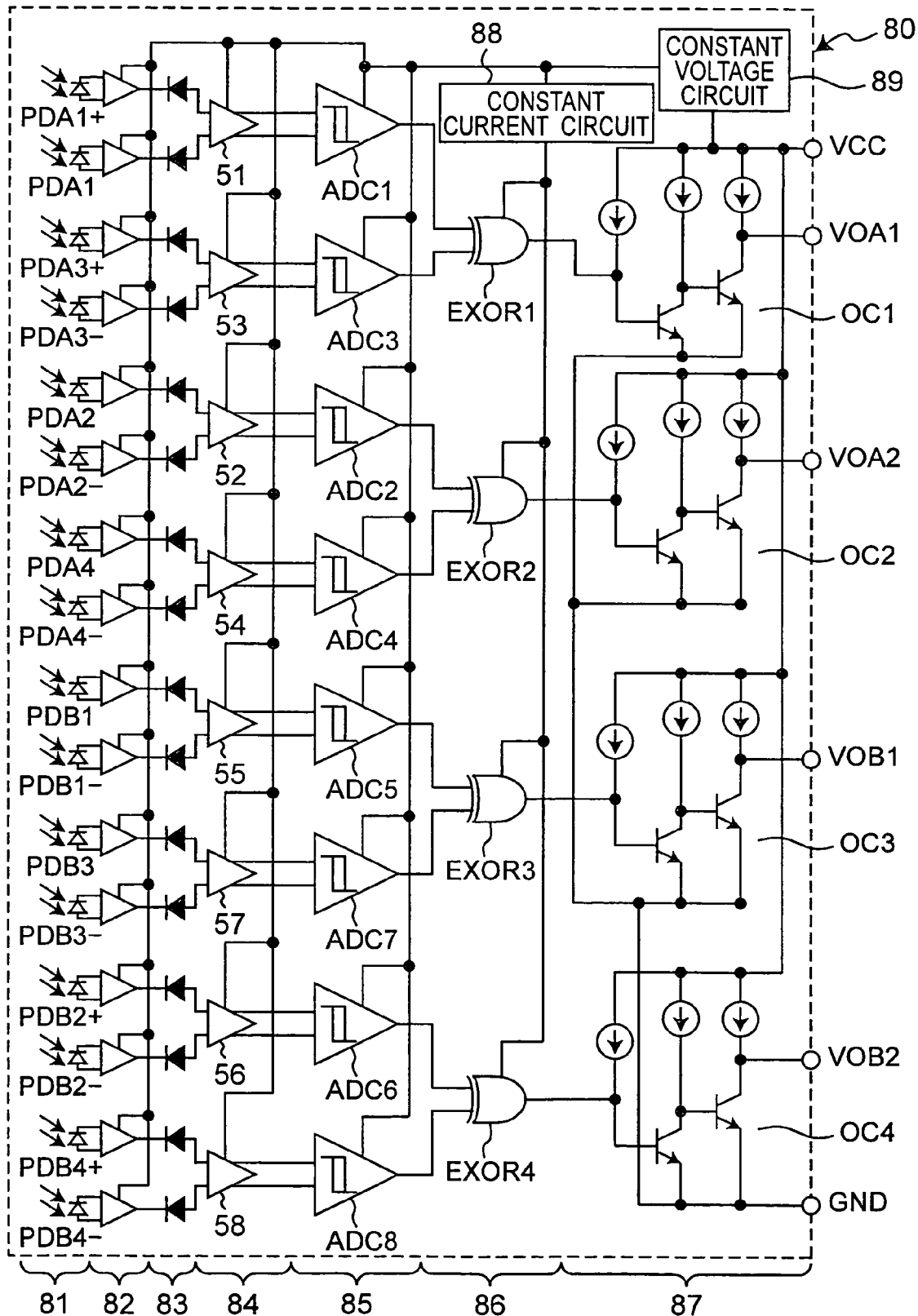
FIG. 23 is a block diagram showing the construction of the photoelectric encoder of one embodiment of the present invention adapted to execute the logical operation shown in FIG. 18.

FIG. 23 illustrates a schematic block construction of a photoelectric encoder when the logical operation shown in FIG. 14 is carried out.

The photoelectric encoder has a light-receiving section 81, a current amplification section 82, a diode section 83, a differential amplification section 84 as the comparing section, an AD conversion section 85, a logic circuit section 86 as a logical operating section, an output circuit section 87, a constant current circuit 88 and a constant voltage circuit 89, which are integrally formed on an identical semiconductor substrate 80 as the semiconductor chip. The light-receiving section 81 includes eight pairs of light-receiving devices PDA1+ through PDB4− (arranged along the rotating direction D in the same order as the light-receiving devices 11a, 11b, . . . 12h in FIG. 7 in the real space). The current amplification section 82 includes current amplifiers corresponding to the light-receiving devices, and the current amplifiers amplify the outputs of the corresponding light-receiving devices in the analog state. The diode section 83 includes diodes corresponding to the current amplifiers, and the diodes convert the outputs of the corresponding current amplifiers into voltages. The differential amplification section 84 includes differential amplifiers 51, 52, . . . , 58 corresponding to the respective diode pairs (therefore light-receiving device pairs), and the differential amplifiers 51, 52, . . . , 58 amplify differences between the outputs of the corresponding diode pairs through logarithmic compression. That is, logarithmic amplifiers are constructed of the respective diode pairs and differential amplifiers. Therefore, even when the light incident on each of the light-receiving devices is faint, a satisfactory SN ratio (signal-to-noise ratio) can be secured. The AD conversion section 85 includes AD converters ADC1, ADC2, . . . , ADC8 corresponding to the differential amplifiers 51, 52, . . . , 58, and the AD converters ADC1, ADC2, . . . , ADC8 subject the outputs of the corresponding differential amplifiers 51, 52, . . . , 58 to analog-to-digital conversion and output digital logic values. The logic circuit section 86 includes exclusive-OR circuits EXOR1, EXOR2, EXOR3 and EXOR4 corresponding to the pairs (51, 53) (52, 54) (55, 57) (56, 58) of the differential amplifiers, i.e., the pairs (ADC1, ADC3) (ADC2, ADC4) (ADC5, ADC7) (ADC6, ADC8) of the AD converters. Then, the exclusive-OR circuits EXOR1, EXOR2, EXOR3 and EXOR4 take an exclusive-OR of the outputs of the pairs (51, 53) (52, 54) (55, 57) (56, 58) of the corresponding differential amplifiers, i.e., between the pairs (ADC1, ADC3) (ADC2, ADC4) (ADC5, ADC7) (ADC6, ADC8) of the AD converters. The output circuit section 87 includes amplifier circuits OC1, OC2, OC3 and OC4 constructed of two transistors corresponding to the exclusive-OR circuits EXOR1, EXOR2, EXOR3 and EXOR4, and the amplifier circuits OC1, OC2, OC3 and OC4 amplify the outputs of the corresponding exclusive-OR circuits (EXOR) and output the amplified signals to output terminals VOA1, VOA2, VOB1 and VOB2. It is noted that VCC represents a terminal to which the power voltage is supplied, and GND represents a terminal grounded. The constant current circuit 88 and the constant voltage circuit 89 supply a constant current and a constant voltage, respectively, to each section of the photoelectric encoder.

Figure 22:
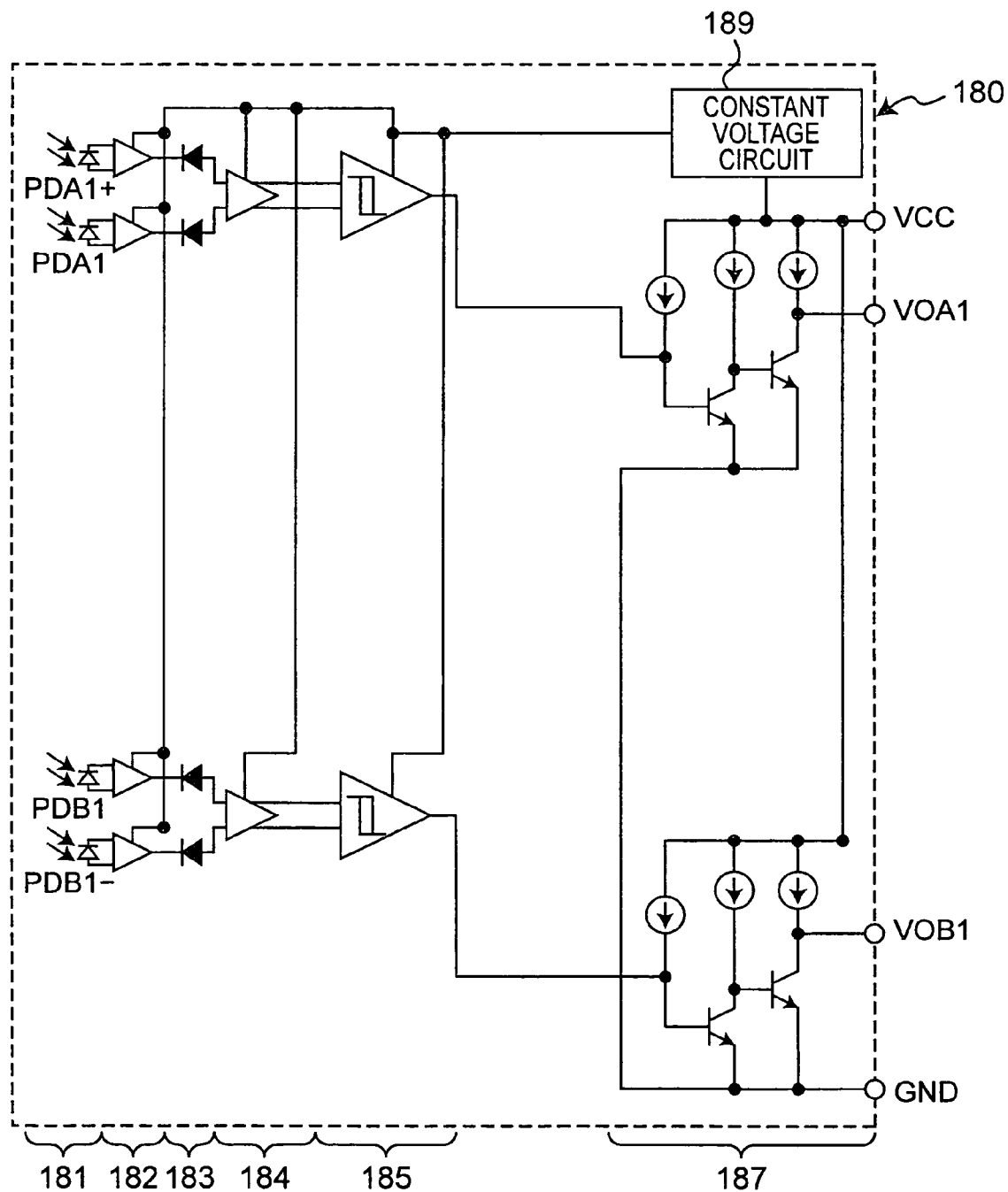
FIG. 22 is a block diagram showing the construction of the photoelectric encoder of a prior art example.
Figure 24:
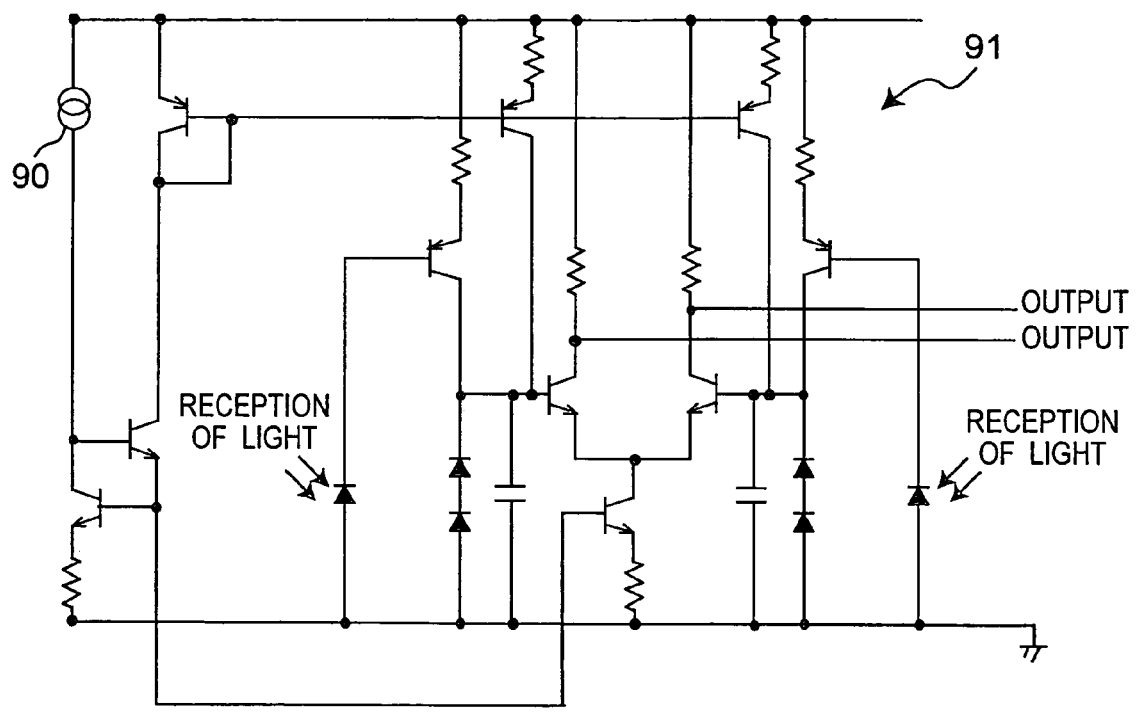
FIG. 24 is a block diagram showing the circuit construction of the differential amplifier in FIG. 23.
Figure 25:
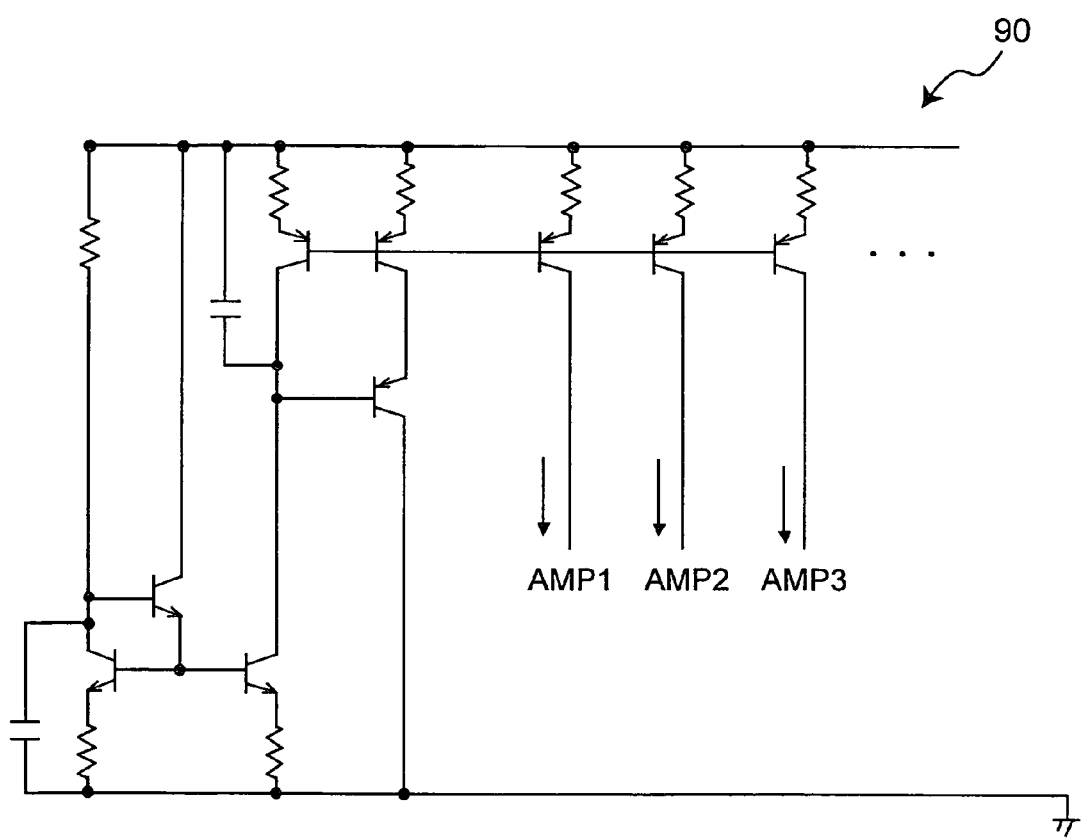
FIG. 25 is a diagram showing an example in which the current supply source of each of the differential amplifiers is constructed of an identical supply current circuit.

FIG. 22 illustrates the schematic construction of a conventional photoelectric encoder. The photoelectric encoder has a light-receiving section 181, a current amplification section 182, a diode section 183, a differential amplification section 184 as a comparing section, an AD conversion section 185, an output circuit section 187 and a constant voltage circuit 189, which are integrally formed on an identical semiconductor substrate 180. The constituent elements corresponding to the constituent elements in FIG. 23 are denoted by reference numerals increased with increments of one hundred (no description is provided for individual ones). As is apparent from a comparison between FIG. 22 and FIG. 23, the number of signals handled is increased in the photoelectric encoder shown in FIG. 23. Therefore, the circuit needs matching. For example, it is assumed that the differential amplifiers 51, 52, ..., 58 shown in FIG. 23 are constructed of the circuit 91 shown in FIG. 24. In the differential amplifiers 51, 52, ..., 58, a current is supplied from a current supply source 90 (included in the constant current circuit 88 in FIG. 23). In the case, it is desirable to constitute the current supply source 90 of the differential amplifiers 51, 52, ..., 58 of an identical supply current circuit as shown in FIG. 25 and supply a current from the supply current circuit to the differential amplifiers 51, 52, ..., 58 (indicated by AMP1, AMP2, AMP3, ... in FIG. 25). With this arrangement, a current matching can be provided among the differential amplifiers 51, 52, ..., 58, and the amplification factors of the differential amplifiers 51, 52, ..., 58 can easily be uniformed identical. As a result, the accuracy of the output signal can be improved.

Figure 26:
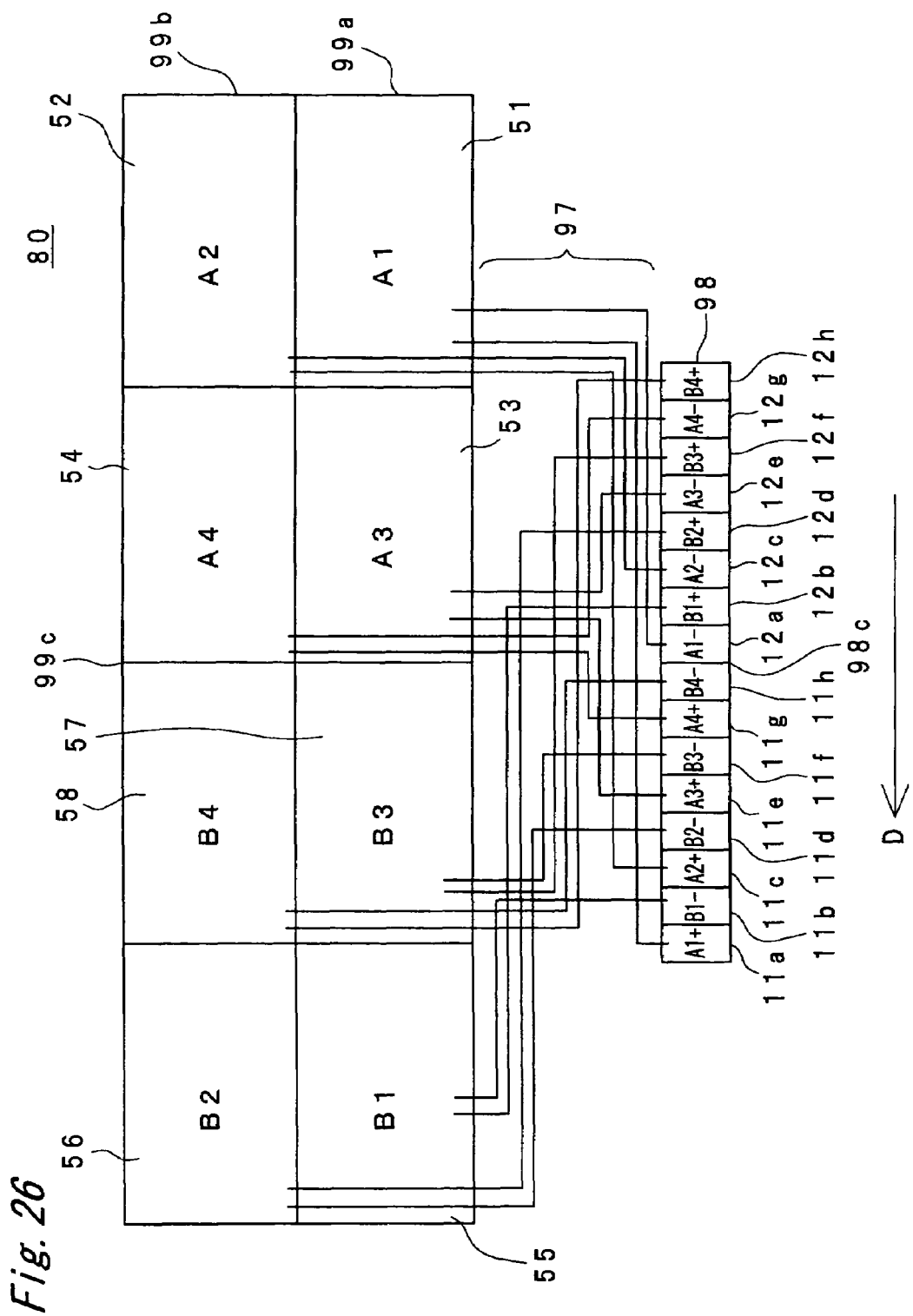
FIG. 26 is a view schematically showing the layout of the light-receiving devices and the differential amplifiers on a semiconductor substrate in the photoelectric encoder of the one embodiment.

Moreover, since the light-receiving devices PDA1+ through PDB4− have a minute output current of several hundreds of nanoampares, a layout from the light-receiving devices PDA1+ through PDB4− to the differential amplifiers 51, 52, ..., 58 on the semiconductor substrate 80 is important. For example, as shown in FIG. 26, it is desirable that arrays 99*a* and 99*b* constructed of the differential amplifiers 51, 52, ..., 58 are arranged along an array 98 constructed of the light-receiving devices PDA1+ through PDB4− (i.e., light-receiving devices 11*a*, 11*b*, ..., 12*h*), and a center position 98*c* of the array 98 constructed of the light-receiving devices and the center position 99*c* of the arrays 99*a* and 99*b* constructed of the differential amplifiers coincide with each other in the real space. That is, the array 98 constructed of the light-receiving devices and the arrays 99*a* and 99*b* constructed of the differential amplifiers should desirably be arranged symmetrically with respect to a straight line that connects the center positions 98*c* with 99*c* (straight line perpendicular to the direction D on the semiconductor substrate 80). According to the layout, the length of wiring lines 97 extending from the plurality of light-receiving devices 11*a*, 11*b*, ..., 12*h* to the plurality of differential amplifiers 51, 52, ..., 58 can be uniformed comparatively satisfactorily. Therefore, variation of signal delay attributed to a difference in the length between the wiring lines 97 and so on can be suppressed. As a result, the accuracy of the output signal can be improved. Moreover, in the layout of FIG. 26, the pairs (51, 53) (52, 54) (55, 57) (56, 58) of the differential amplifiers whose exclusive-OR is taken are adjacently arranged in the direction D. Therefore, the variation of the signal delay attributed to the difference in the length between the wiring lines from the pairs (51, 53) (52, 54) (55, 57) (56, 58) of the differential amplifiers to the exclusive-OR circuits EXOR1, EXOR2, EXOR3 and EXOR4 and so on can be suppressed. Therefore, the accuracy of the output signal can further be improved.

Figure 27:
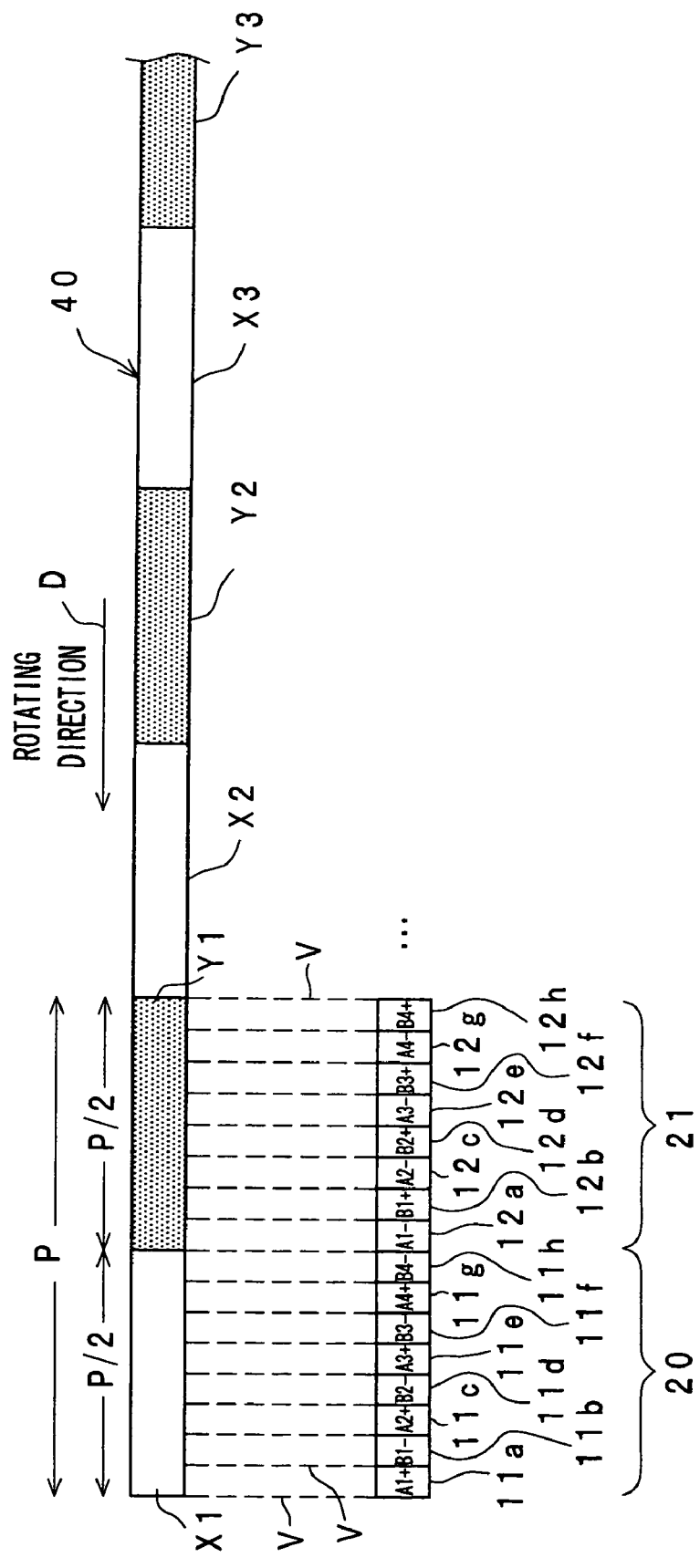
FIG. 27 is a view schematically showing the arrangement of the slits and the light-off portion of the moving object and the light-receiving devices in the photoelectric encoder of the one embodiment.

FIG. 27 shows more in detail the arrangement of the light-receiving devices 11*a*, 11*b*, ..., 12*h* (the same arrangement as that of FIG. 7). As shown in FIG. 27, the ends of the light-receiving devices 11*a*, 11*b*, ..., 12*h* are arranged in correspondence with lines V, V, ... obtained by dividing the slit corresponding region 20 and the light-off portion corresponding region 21 at equal intervals in the direction D. Therefore, the dimension of the light-receiving devices 11*a*, 11*b*, ..., 12*h* can be maximized in the regions divided in the direction D. Therefore, the photodetection surfaces of the light-receiving devices 11*a*, 11*b*, ..., 12*h* can be widened to allow high sensitivity to be achieved.

Figure 28:
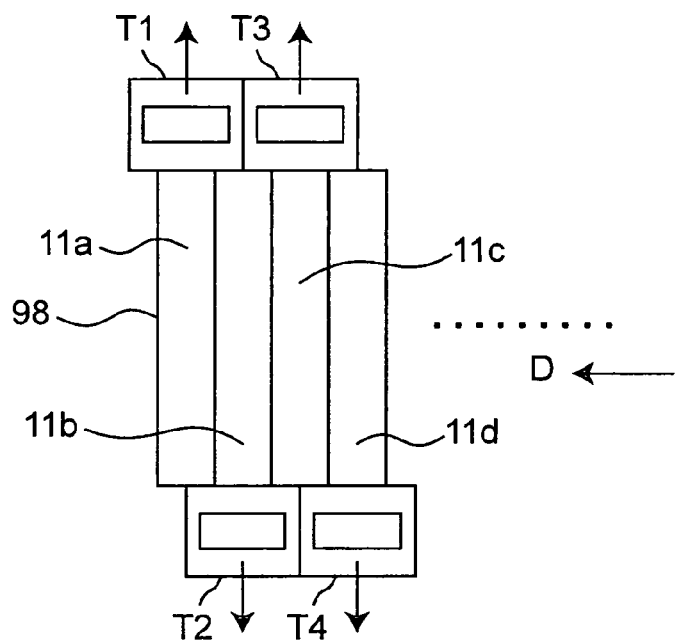
FIG. 28 is a view showing the concrete arrangement of the photoelectric current output port of the light-receiving device.

FIG. 28 shows the concrete arrangement of photoelectric current output ports T1, T2, T3, T4, ... of the outputs of the light-receiving devices 11*a*, 11*b*, 12*h* (the ports referred to as "photoelectric current output ports") (portions concerning the four light-receiving devices 11*a*, 11*b*, 11*c* and 11*d* located at the left end portion are only shown for the sake of simplicity).

In order to obtain a frequency higher than the movement frequency, it is desirable to reduce the dimension of the light-receiving devices 11*a*, 11*b*, ..., 12*h* in the direction D for the achievement of high resolution. However, if the dimension of the light-receiving devices is merely reduced, the area necessary for the photoelectric current output ports of the light-receiving devices cannot be secured, and the arrangement becomes difficult. Accordingly, in this example as shown in FIG. 28, the photoelectric current output ports T1, T2, T3, T4, ... of the light-receiving devices mutually adjacent in the direction D are arranged on the mutually opposite sides of the array 98 constructed of the plurality of light-receiving devices 11*a*, 11*b*, ..., 12*h* in the direction perpendicular to the direction D. In detail, the photoelectric current output ports T1, T3, ... of the odd-number light-receiving devices 11*a*, 11*c*, ... from the left end are provided on the upper side (in FIG. 28) of the array 98, while the photoelectric current output ports T2, T4, ... of the even-number light-receiving devices 11*b*, 11*d*, ... from the left end are provided on the lower side (in FIG. 28) of the array 98. With this arrangement, even when the dimension of the light-receiving devices 11*a*, 11*b*, ..., 12*h* is reduced in the direction D as shown in FIG. 28, an area necessary for the photoelectric current output ports T1, T2, T3, T4, ... of the light-receiving devices can be secured, and the arrangement becomes possible.

Figure 29:
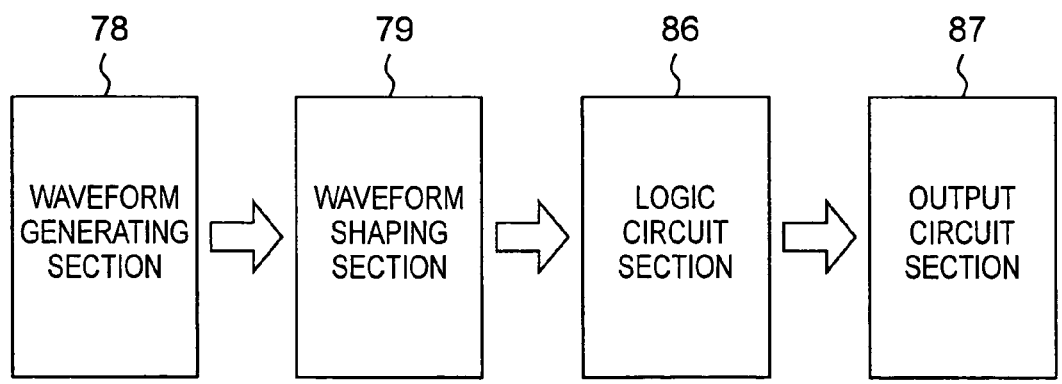
FIG. 29 is a view illustrating the block construction in which a waveform shaping section is provided immediately before the logic circuit section.

FIG. 29 illustrates a block construction in which a waveform shaping section 79 is provided in place of the AD conversion section 85 immediately before the logic circuit section 86 in FIG. 23. It is noted that a waveform generating section 78 in FIG. 29 is shown inclusive of the light-receiving section 81, the current amplification section 82, the diode section 83 and the differential amplification section 84 as the comparing section shown in FIG. 23.

Figure 31A:
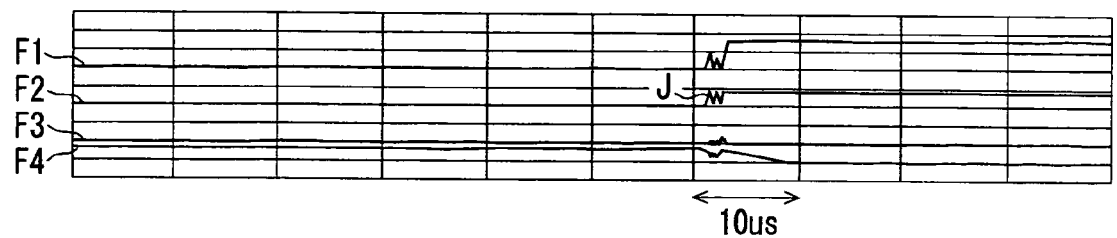
FIG. 31A is a graph showing the signal waveforms of portions when the waveform shaping section is not provided.
Figure 31B:
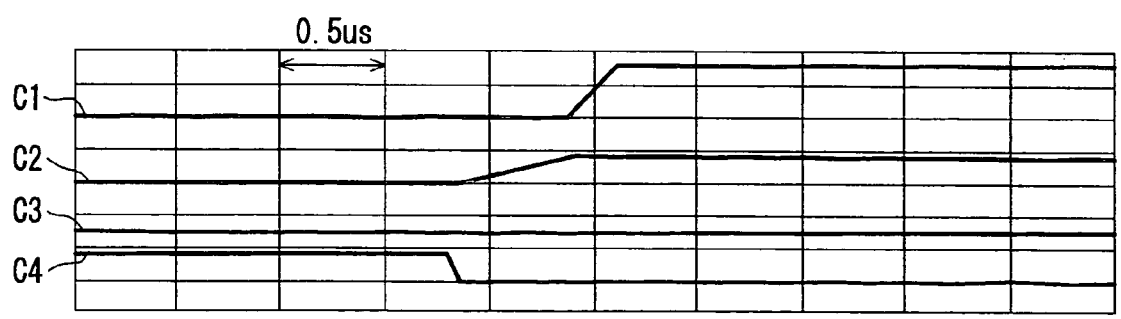
FIG. 31B is a graph showing the signal waveforms of the portions when the waveform shaping section is provided.

When the movement frequency f of the moving object 40 is set low, the waveform changes in the outputs of the light-receiving devices PDA1+ through PDB4− (i.e., the light-receiving devices 11*a*, 11*b*, ..., 12*h*) become gentle, and the rise and fall of the waveforms of inputs F3 and F4 to the logic circuit section 86 also become gentle as shown in FIG. 31A. Therefore, it is possible that a chattering phenomenon (phenomenon that high and low levels frequently change in a short time) J might occur in the output signal F2 of the logic circuit section 86 as a consequence of changes in the inputs F3 and F4 to the logic circuit section 86 across the threshold value for the logical operation under the influences of noise and the like during the rise or fall of the inputs to the logic circuit section 86. In the case, the output F1 of the output circuit section 87 also change. Accordingly, in the example of FIG. 29, the waveform shaping section 79 shapes the waveforms of the inputs C3 and C4 (C4 in the example) to the logic circuit section 86 so that the rise and fall of the waveforms become steep as shows in FIG. 31B. As a result, the rise and fall of the output waveform C2 of the differential amplification section 84 become steep (note that FIG. 31B is expanded in the horizontal direction (direction of the time base) in comparison with FIG. 31A). As a result, the inputs to the logic circuit section 86 become hard to receive the influence of noise and the like, and the chattering phenomenon can be prevented from occurring. In the case, the transition of the output C2 in the logic circuit section 86 is stabilized, and the transition of the output C1 of the output circuit section 87 is also stabilized.

Figure 30A:
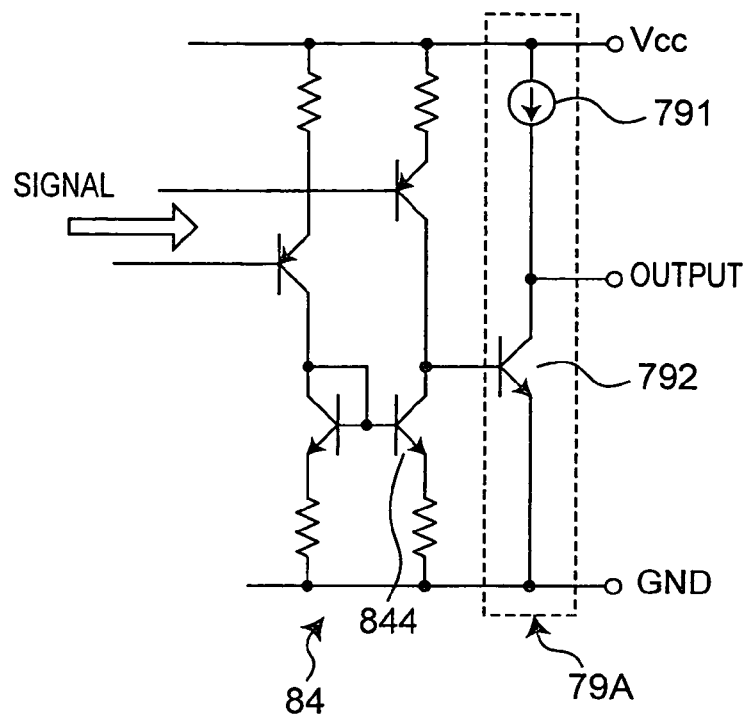
FIG. 30A is a diagram showing a circuit example that constitutes the waveform shaping section.

In concrete, as in the circuit example 79A (part enclosed by the dashed line) shown in FIG. 30A, the waveform shaping section 79 is constructed of a constant-current source 791 and an npn transistor 792 inserted between the power source Vcc and the ground GND. The npn transistor 792 receives the output of the differential amplification section 84 (collector potential of the npn transistor 844) at its base, amplifies the output and forms an output at its collector.

Figure 30B:
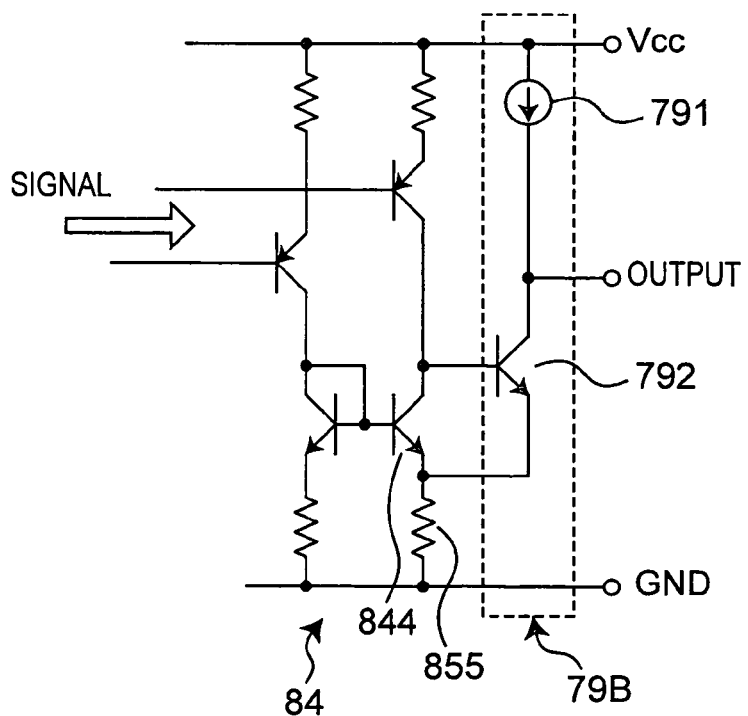
FIG. 30B is a diagram showing another circuit example that constitutes the waveform shaping section.

It is acceptable to connect the emitter of the npn transistor 792 between the emitter of an npn transistor 844 and a resistor 855 located on the GND side in the differential amplification section 84 as in the circuit example 79B shown in FIG. 30B. With the arrangement, the emitter potential of the npn transistor 792 can be pulled up when the npn transistor 792 is turned on, and this therefore prevents the occurrence of malfunction.

Figure 32:
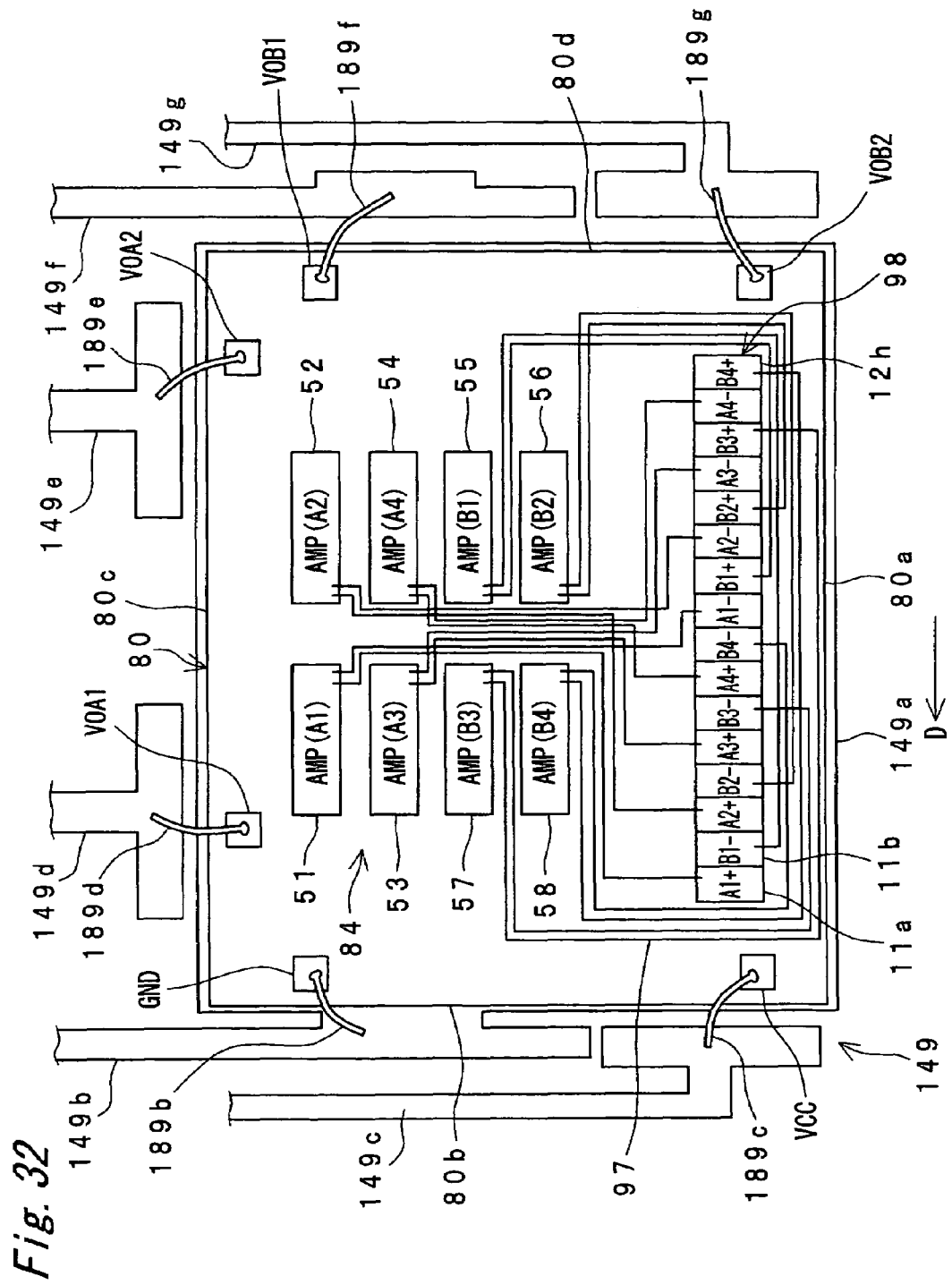
FIG. 32 is a view showing an example in which the semiconductor substrate is mounted on the header portion of a lead frame.

FIG. 32 shows a mounting example in which the semiconductor substrate 80 as the semiconductor chip is mounted on the header portion 149a of the lead frame 149 in the real space. The lead frame 149 includes a lead pin 149b for grounding continued integrally with the header portion 149a, a lead pin 149c to which the power voltage is supplied and four lead pins 149d, 149e, 149f and 149g for signal output.

In the example, the array 98 constructed of the light-receiving devices 11a, 11b, . . . , 12h is arranged along one side (lower side in FIG. 32) 80a on the surface of the semiconductor substrate 80. Moreover, a power terminal VCC and a grounding terminal GND are arranged along a left side 80b. Output terminals VOA1 and VOA2 are arranged along an upper side 80c, and output terminals VOB1 and VOB2 are arranged along a right side 80d. The lead pins 149b, 149c, 149d, 149e, 149f and 149g are connected to the corresponding terminals (bonding pads) GND, VCC, VOA1, VOA2, VOB1 and VOB2 via Au wires 189b, 189c, 189d, 189e, 189f and 189g, respectively.

Moreover, in this example, the differential amplifiers 51, 52, . . . , 58 that constitute the differential amplification section 84 are arranged gathered in the center portion on the surface of the semiconductor substrate 80, slightly differently from the layout shown in FIG. 26. With the arrangement, variation in the manufacturing processes and variation ascribed to a stress and so on can be suppressed between the amplifiers.

On the other hand, in this example, as in the layout shown in FIG. 26, the pairs (51, 53) (52, 54) (55, 57) (56, 58) of the differential amplifiers where an exclusive-OR of the logical values expressed by the outputted differential signals is taken among the differential amplifiers 51, 52, . . . , 58 are arranged mutually adjacently. Therefore, although not shown in FIG. 32, by arranging the constituent elements of the logic circuit section 86 and the output circuit section 87 shown in FIG. 23 so that the sections surround the differential amplification section 84, the wiring lines from the pairs (51, 53) (52, 54) (55, 57) (56, 58) of the differential amplifiers to the exclusive-OR circuits EXOR1, EXOR2, EXOR3 and EXOR4 are simplified, and mutual influences between the differential signals, variation in the wiring resistance and so on are suppressed. In addition, the variation in the signal delay and so on attributed to the difference in the length between the wiring lines can be suppressed. Therefore, the accuracy of the output signal can further be improved. Moreover, by virtue of the adjacent location of the logic circuit section 86 to the output terminals VOA1, VOA2, VOB1 and VOB2 via the output circuit section 87, the wiring resistance from the logic circuit section 86 to the output terminals VOA1, VOA2, VOB1 and VOB2 can be reduced.

Figure 33:
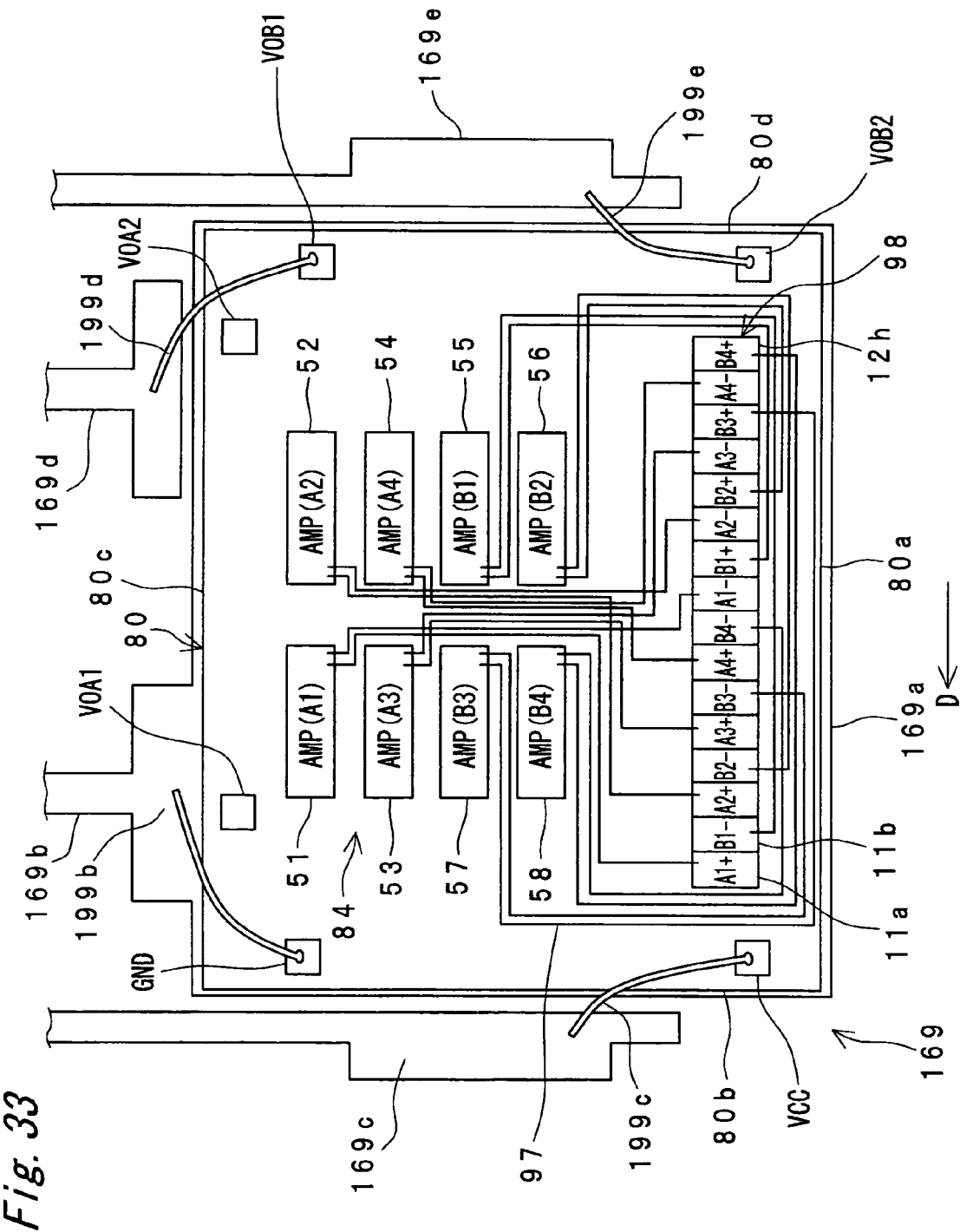
FIG. 33 is a view showing an example in which the same semiconductor substrate as the one shown in FIG. 32 is mounted on the header portion of another lead frame.

FIG. 33 shows a mounting example in which the same semiconductor substrate 80 as that shown as the semiconductor chip in FIG. 32 is mounted on the header portion 169a of another lead frame 169 in the real space. The mounting example takes out only two output signals in place of four output signals from the semiconductor substrate 80.

The lead frame 169 includes a lead pin 169b for grounding continued integrally with the header portion 169a, a lead pin 169c to which the power voltage is supplied, and two lead pins 169d and 169e for signal output. The lead pins 169b, 169c, 169d and 169e are connected to the corresponding terminals (bonding pads) GND, VCC, VOB1 and VOB2 via Au wires 199b, 199c, 199d and 199e, respectively.

By virtue of the layout on the surface of the semiconductor substrate 80 and, in particular, the terminals GND, VCC, VOB1 and VOB2 arranged along the peripheral portion of the semiconductor substrate 80, products of different types can be manufactured in spite of employing the same semiconductor substrate 80.

When the output signal formed by the logic circuit section 86 is taken out of the semiconductor substrate 80, it is sometimes the case where the amount of current is increased to make the output signal have low impedance. In such a case, the voltage change becomes large when the output signal changes between high level and low level. Therefore, it is concerned that such a voltage change is fed back to the input of the logic circuit section 86 and sometimes causes malfunction. In such a case, it is desirable to provide a delay section that delays the output signal formed by the logic circuit section 86 with respect to the signal inputted to the logic circuit section 86, and this prevents the occurrence of malfunction. Such a delay section is well known and constituted by introducing a capacitance or the like (not shown). However, it is necessary to adjust the capacitance value in conformity to the frequency used.

Figure 34:
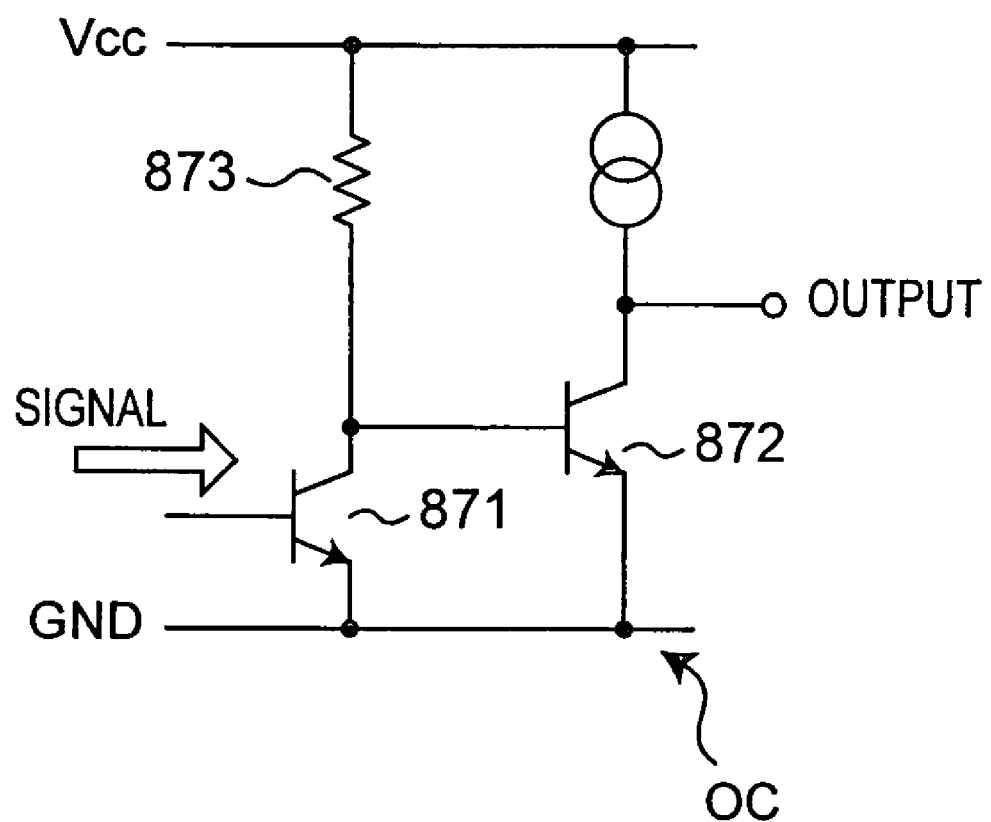
FIG. 34 is a diagram showing a structural example in which the base current of the transistor of the amplifier circuit that constitutes an output circuit section is of the power voltage dependence type.

Moreover, although the constant current is supplied as the base current to the transistors of the amplification circuits OC1, OC2, OC3 and OC4 that constitute the output circuit section 87 in the example of FIG. 23, the present invention is not limited to this. For example, the amplification circuit OC shown in FIG. 34 has a pre-stage npn transistor 871 that receives the signal from the exclusive-OR circuit at its base and amplifies the same, and a post-stage npn transistor 872 that receives the output of the transistor 871 at its base and amplifies the same. The base of the post-stage npn transistor 872 is connected to the power source Vcc via a resistor 873. That is, the base current of the transistor 872 is a power voltage dependence current. When the base current is the power voltage dependence type as described above, a capability to extract the current is improved. Therefore, the malfunction of the output circuit section 87 and, consequently, the photoelectric encoder are suppressed even when electric charge is accumulated by the turbulence of static electricity or the like.

In the electronic equipment provided with the photoelectric encoder, the photoelectric encoder detects the passing of the slits X1, X2, ... and the light-off portions Y1, Y2, ... of the moving object 40 with high accuracy. Therefore, appropriate operation can be carried out by using the detection results.

Although the photoelectric encoder of the light transmission type has been described in the present embodiment, the present invention is, of course, not limited to it. The present invention is similarly applied to the photoelectric encoder of the light reflection type. It is noted that the slits of the moving object correspond to the light-off portion that makes no light be incident on the light-receiving devices, and the portions constructed of the plate member (portions that reflects light) located between the slits correspond to the light-on portion that makes light be incident on the light-receiving devices in the light reflection type conversely to the light transmission type, as already described.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A photoelectric encoder comprising:
   a light-emitting device; and
   a plurality of light-receiving devices arranged in one direction in a region that light from the light-emitting device can reach, for detecting an amount of movement of a moving object, the moving object alternately having in a common pitch a light-on portion that produces a state in which light is incident from the light-emitting device to the light-receiving devices and a light-off portion that produces a state in which the light is not incident from the light-emitting device to the light-receiving devices, wherein
      the plurality of light-receiving devices have same dimensions and comprise a first group of four light-receiving devices which are arranged in the one direction in a second pitch such that phases of the four light-receiving devices in the first group are different from each other by 45° in a light-on portion width and a second group of four light-receiving devices which are arranged in a third pitch such that phases of the four light-receiving devices in the second group are different from each other by 45° in a light-off portion width, the second group of four light-receiving devices corresponding with the first group of four light-receiving devices; and
   a comparing section which respectively obtains first, second, third and fourth differential signals by taking a difference between outputs of light-receiving device pairs, each light-receiving device pair having a first light-receiving device from the first group of light-receiving devices and a second light-receiving device from the second group of light-receiving devices, of which phases of the paired outputs are different from each other by 180°;
   a first logical operating section which takes an exclusive-OR of logical values expressed by the first and second differential signals that have phases different from each other by 90°; and
   a second logical operating section which takes an exclusive-OR of logical values expressed by the third and fourth differential signals that have phases different from each other by 90°, wherein
      the comparing section comprises a plurality of amplifiers corresponding to the respective light-receiving device pairs,
      the plurality of amplifiers are arranged in the one direction along an array constructed of the plurality of light-receiving devices, and
      a center position of the array constructed of the plurality of light-receiving devices and a center position of an array constructed of the plurality of amplifiers coincide with each other in the one direction.

2. The photoelectric encoder as claimed in claim 1, further comprising:
   a plurality of identical supply current circuits, each for supplying a current to one of the amplifiers.

3. The photoelectric encoder as claimed in claim 1, wherein the plurality of amplifiers are arranged in a center portion of a semiconductor substrate on which the plurality of light-receiving devices are arranged in common.

4. The photoelectric encoder as claimed in claim 1, wherein among the plurality of amplifiers, amplifiers arranged adjacent to each other make a pair of amplifiers, and
   logical values each of which is expressed by the differential signal outputted from the pair of amplifiers are subjected to operation by the first or second logical operating section.

5. Electronic equipment comprising the photoelectric encoder claimed in claim 1.

* * * * *